(12) United States Patent
Yamashita et al.

(10) Patent No.: US 7,653,339 B2
(45) Date of Patent: Jan. 26, 2010

(54) PROTECTIVE AGENT, IMAGE FORMING APPARATUS, AND PROCESS CARTRIDGE

(75) Inventors: Masahide Yamashita, Tokyo (JP); Hiroshi Nakai, Kanagawa (JP); Masato Iio, Kanagawa (JP); Shinya Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 252 days.

(21) Appl. No.: 11/931,644

(22) Filed: Oct. 31, 2007

(65) Prior Publication Data

US 2008/0118286 A1    May 22, 2008

(30) Foreign Application Priority Data

Nov. 22, 2006   (JP)  .............................. 2006-315420

(51) Int. Cl.
*G03G 21/00* (2006.01)
(52) U.S. Cl. ..................................................... 399/346
(58) Field of Classification Search ................. 399/159, 399/174, 343, 346
See application file for complete search history.

(56) References Cited

U.S. PATENT DOCUMENTS 5,812,919 A * 9/1998 Takano et al. ........... 399/346 X
6,295,438 B1 * 9/2001 Fujishiro et al. ............ 399/346
6,330,420 B1 * 12/2001 Honda ......................... 399/346
7,035,582 B2 * 4/2006 Suda et al. .................. 399/346
2004/0018028 A1 * 1/2004 Chiba et al. ................. 399/149
2005/0152722 A1 * 7/2005 Tawada et al. .............. 399/346

FOREIGN PATENT DOCUMENTS

| JP | 51-22380 | 7/1976 |
|----|----------|--------|
| JP | 2000-330441 | 11/2000 |
| JP | 2002-97483 | 4/2002 |
| JP | 2004-302451 | 10/2004 |
| JP | 2005-99125 | 4/2005 |
| JP | 2005-274737 | 10/2005 |

* cited by examiner

*Primary Examiner*—Sandra L Brase
(74) *Attorney, Agent, or Firm*—Oblon, Spivak, McClelland, Maier & Neustadt, L.L.P.

(57) ABSTRACT

A protective agent for forming a protective layer on the surface of an image carrier includes at least a hydrophilic organic compound and an amphiphilic organic compound at a ratio of 1/99 to 20/80. Preferably, the hydrophilic organic compound contains at least one selected from a polysaccharide and a polyether compound, or the amphiphilic organic compound contains a nonionic surfactant.

18 Claims, 3 Drawing Sheets

PROTECTIVE AGENT, IMAGE FORMING APPARATUS, AND PROCESS CARTRIDGE

CROSS-REFERENCE TO RELATED APPLICATIONS

The present application claims priority to and incorporates by reference the entire contents of Japanese priority document, 2006-315420 filed in Japan on Nov. 22, 2006.

BACKGROUND OF THE INVENTION

1. Field of the Invention

The present invention relates to a protective agent for an image carrier, an image forming apparatus, and a process cartridge.

2. Description of the Related Art

As is generally known, in an electrophotographic image forming system, an electrostatic latent image is formed from electrostatic charges on an image carrier having a photoconductive layer including, for example, a photoconductive substance, and a charged toner is permit to adhere to the electrostatic latent image to form a visible image. The visible image is transferred onto a recording medium, such as paper, and then fixed to the recording medium by heat, pressure, or solvent vapor, obtaining an output image.

The image formation is roughly classified, according to the method for charging the toner to form a visible image, into a two-component development system using frictional charging by stirring and mixing the toner and carrier and a one-component development system in which the toner is charged without using a carrier. The one-component development system is further classified into a magnetic one-component development system and a non-magnetic one-component development system according to the use of magnetic force in keeping the toner on a development roller.

In a copier or a multifunction product having the function of a copier, which is required to have high speed and excellent image reproducibility, the two-component development system has been widely used to meet the demands where the machine should have excellent toner charging stability, excellent starting up properties, or long stability of image quality. On the other hand, in a small-size printer or facsimile which is strongly required to occupy a less space or reduce the cost, the one-component development system has been widely used.

Recently, in any development systems, color output images have widely spread, and there are further increasing demands where the image should be improved in quality or the image quality should be stabilized. For achieving high-quality images, the toner is reduced in an average particle diameter, or the toner particle is rounded and has no sharp edges.

In a general electrophotographic image forming apparatus, regardless of the development system, an image carrier in a drum form or a belt form is uniformly charged while rotating, and a latent image is formed on the image carrier using, for example, a laser beam. The latent image is developed into a visible image (toner image) with toner, and the visible image is transferred onto a recording medium. After transfer of the toner image, residual toner remains on the image carrier. When the image carrier having such residual toner is subject to charging, the image carrier cannot be uniformly charged due to the residual toner. Therefore, generally, after transfer of a toner image, toner and others remaining on the image carrier are removed by a cleaning unit, such as a cleaning blade, so that the surface of the image carrier is satisfactorily cleaned and prepared for the following charging.

The surface of the image carrier is exposed to various physical stresses or electrical stresses at the process of charging, development, transfer, cleaning, and others, and the surface state changes with the passage of use time. Among the stresses, stresses due to friction at the cleaning wear the image carrier to cause a fretting damage. For solving this problem, there have been proposed technologies to reduce the frictional force between the image carrier and the cleaning blade with respect to the lubricant, the method for feeding a lubricating component, and the method for forming a lubricant film.

For example, Japanese Patent Application Publication No. S51-22380 discloses a technology in which a solid lubricant mainly containing zinc stearate is fed to the surface of a photoconductor to form a lubricant film for extending the life of a photoconductor or cleaning blade.

Japanese Patent Application Laid-open No. 2005-274737 describes that, when a lubricant to be fed includes a higher alcohol having 20 to 70 carbon atoms, the higher alcohol remains in the form of indefinite particles at the tip of a blade nip portion, and has appropriate wettability to the surface of the image carrier to keep the lubricating properties.

Japanese Patent Application Laid-open No. 2002-97483 has proposed the use of powder of a specific alkylenebisalkyl acid amide compound as a lubricating component. With this, the powder is present between a cleaning blade and the surface of an image carrier, and an lubricating effect can be maintained for a long term.

As mentioned above, the image carrier is exposed not only to stresses applied at the cleaning but also to electrical stresses, and particularly the electrical stresses applied at the charging operation considerably change the surface of the image carrier. The electrical stresses are remarkable in a contact charging system or near charging system such that a discharge phenomenon occurs near the surface of the image carrier. In these charging systems, a large amount of active species or reaction products are caused on the surface of the image carrier, and active species or reaction products generated in air in the discharge region markedly adsorb on the surface of the image carrier.

Therefore, the lubricant disclosed in Japanese Patent Application Publication No. S51-22380 using zinc stearate relatively uniformly covers the surface of the image carrier to achieve excellent lubricating properties. However, when the resultant lubricant layer is repeatedly subject to the charging operation, stearic acid is decomposed and eventually the zinc oxide formed remains on the surface of the image carrier or the surface of the charging member. The remaining zinc oxide has moisture absorption, and moisture in air adsorbs on the zinc oxide to lower the resistance, and therefore electrostatic charges cannot keep on the image carrier in a high-humidity environment and the resultant electrostatic latent image is not clear, causing an image defect, i.e., so-called image blur.

The lubricant disclosed in Japanese Patent Application Laid-open No. 2005-274737 having a higher alcohol has wettability to the surface of the image carrier and is expected to serve as a lubricant. However, it is likely that the higher alcohol molecules adsorbing on the image carrier have a large adsorption occupying area per one molecule, and hence the density of the adsorbing molecules per unit area of the image carrier (weight of the adsorbing molecules per unit area) is small. Therefore, the electrical stresses easily penetrate the protective layer, making it difficult to protect the image carrier satisfactorily.

In the lubricant of Japanese Patent Application Laid-open No. 2002-97483 containing a nitrogen atom in its molecule, when the electrical stresses are applied to the lubricant, the lubricant itself forms a decomposition product formed of an ionically dissociating compound, such as a nitrogen oxide or an ammonium-containing compound, and the decomposition product is drawn in the lubricant layer, so that the lubricant layer is reduced in resistance at a high humidity, causing image blur.

An image forming apparatus or components used in the image forming apparatus having a long life leads to the reduction of the running cost and the reduction of waste resulting in protection of the earth environment, and therefore, attracts attentions from the market. For example, Japanese Patent Application Laid-open No. 2004-302451 discloses an image carrier having a long life with a specific layer of a crosslinked structure on the surface thereof to improve its mechanical durability.

As mentioned above, for removing the low-resistance substance drawn in the lubricant layer of the image carrier, the whole lubricant layer needs to be removed by, for example, a cleaning mechanism. However, large force is needed in the removal due to the lubricity of the lubricant layer, and further a great amount of mechanical stresses are applied to the image carrier during the removal of the lubricant layer. Therefore, even when a specific surface layer having a crosslinked structure is formed on the surface of the image carrier as disclosed in Japanese Patent Application Laid-open No. 2004-302451, the resultant image carrier does not have a life longer than ever.

Recently, toner produced by polymerization (polymerized toner) for improving the image quality or reducing the production energy is on the market. The polymerized toner has excellent features such that it has less sharp edges and has a small and uniform average particle diameter, as compared to toner produced by grinding (grinded toner). However, in a system in which the edge portion of a cleaning member, such as a cleaning blade made of a rubber, is pressed against the surface of the image carrier to clean the surface of the image carrier, the polymerized toner is difficult to remove by the edge portion due to the form and particle diameter of the toner, leading to a problem in that the remaining toner component is likely to cause a cleaning failure.

For example, Japanese Patent Application Laid-open No. 2000-330441 discloses an image forming apparatus including a conventional cleaning device that can remove such a toner-cleaning failure. In the image forming apparatus, pressing force is controlled using, for example, a volume average particle diameter D and an average circularity S of toner so that the pressing force meets predetermined conditions. When a pressing force f of a counter-type cleaning blade is increased, the cleaning blade disadvantageously squeals or turns over, and therefore, the upper limit as an empirical value needs to be set.

Japanese Patent Application Laid-open No. 2005-99125 discloses a conventional cleaning device that cleans toner having a smaller average particle diameter in a shape close to sphere. In the conventional cleaning device, the coefficient of friction between toner and an image carrier, the coefficient of friction between the toner and a blade, the adhesion between the toner and the image carrier, a force applied to the toner by the blade, and an angle between the blade and the image carrier (cleaning angle) are individually set.

With the conventional cleaning devices, cleaning properties for polymerized toner which is a representative example of a spherical toner are improved with less stress on the image carrier from the cleaning mechanism. However, the service life of image carrier is not taken into account by reducing electrical stresses on the image carrier, and there is a room for improvement.

SUMMARY OF THE INVENTION

It is an object of the present invention to at least partially solve the problems in the conventional technology.

According to an aspect of the present invention, a protective agent for forming a protective layer on an image carrier comprising a hydrophilic organic compound and an amphiphilic organic compound. A weight ratio of the hydrophilic organic compound to the amphiphilic organic compound is 1/99 to 20/80.

According to another aspect of the present invention, an image forming apparatus includes an image carrier; an image forming unit that forms an electrostatic latent image on the image carrier; a developing unit that develops the electrostatic latent image into a visible image with toner; a transfer unit that transfers the visible image onto a recording medium; a fixing unit that fixes the visible image to the recording medium; and a protective-layer forming unit that applies a protective agent to a surface of the image carrier to form a protective layer on the surface. The protective agent contains a hydrophilic organic compound and an amphiphilic organic compound. A weight ratio of the hydrophilic organic compound to the amphiphilic organic compound is 1/99 to 20/80.

According to still another aspect of the present invention, a process cartridge that is configured to be detachably attached to an image forming apparatus, includes an image carrier; and a protective-layer forming unit that applies a protective agent to a surface of the image carrier to form a protective layer on the surface. The protective agent contains a hydrophilic organic compound and an amphiphilic organic compound. A weight ratio of the hydrophilic organic compound to the amphiphilic organic compound is 1/99 to 20/80.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
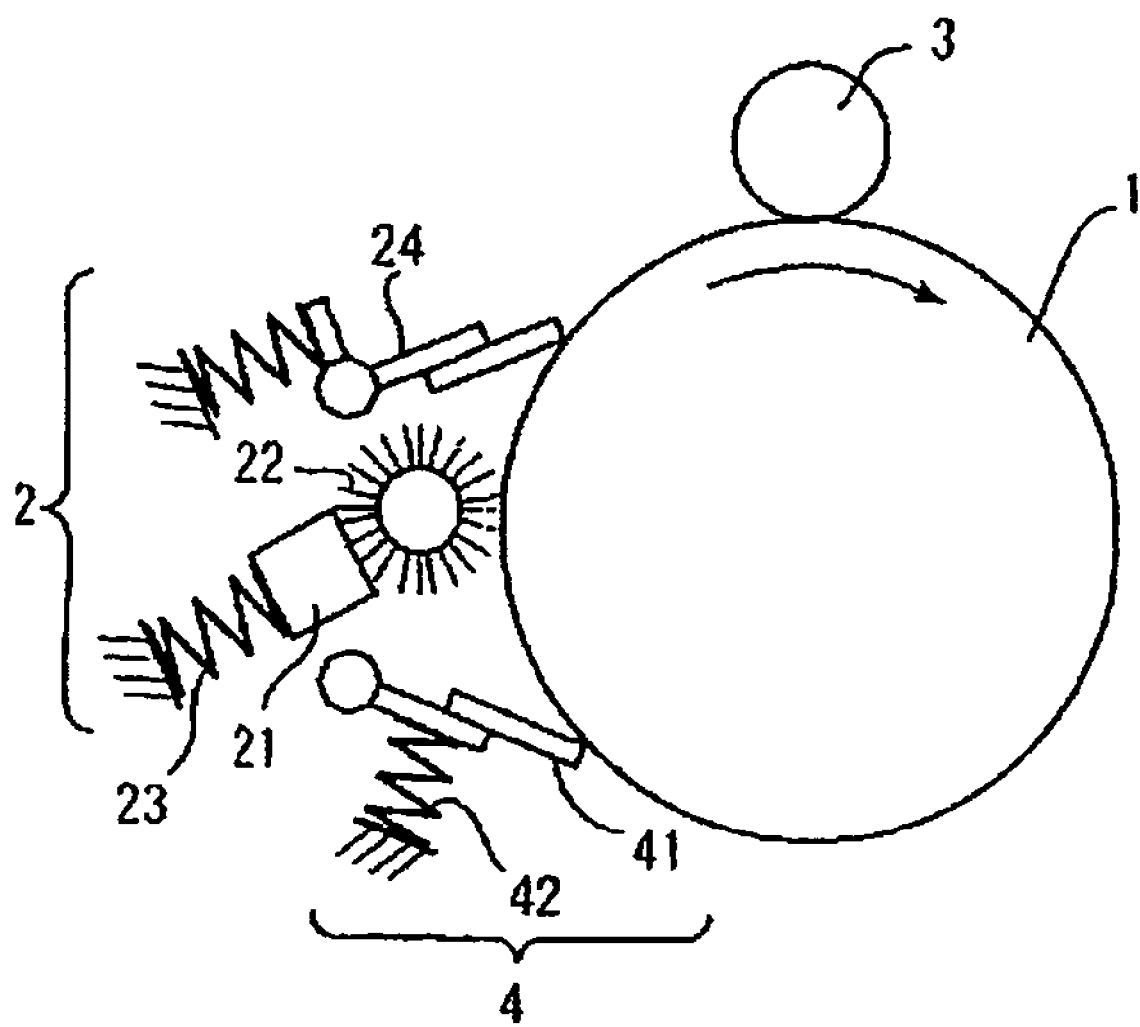
FIG. 1 is a schematic diagram of a device that forms a protective layer formed of a protective agent according to an embodiment of the present invention.

Exemplary embodiments of the present invention are explained in detail below with reference to the accompanying drawings.

A protective agent for an image carrier according to an embodiment of the present invention is explained below.

(Protective Agent)

The protective agent according to the embodiment includes at least a hydrophilic organic compound and an amphiphilic organic compound in a specific ratio, and additional components, as necessary.

(Hydrophilic Organic Compound)

There is no particular limitation with respect to the hydrophilic organic compound, and it can be appropriately selected depending on the purpose. The preferred compound is a hydrophilic organic compound having an affinity with only the hydrophilic portion of the amphiphilic organic compound. Examples include polysaccharides, such as amylose, amylopectin, and cellulose, and partial substitution products thereof; polyethers, such as polyethylene glycol and polypropylene glycol; polyhydric alcohols, such as pentitol, hexitol, heptitol, and octitol; polyol resins; and acrylic acid copolymer resins. These can be used individually or in combination.

Among these, preferred is a polysaccharide which has a stable molecular structure and which is excellent in safety and inexpensive, or a polyether having a relatively small molecular weight, such as polyalkylene glycol.

It is particularly preferred that, as the hydrophilic organic compound, a polysaccharide formed by dehydration-condensation of 10 to 100 monosaccharides on average or a polyether compound having a weight average molecular weight Mw of 400 to 6,000 is used. In this case, the interaction between the hydrophilic organic compound and the hydrophilic site in the amphiphilic organic compound causes an isolated hydrophilic pocket to be stably present in the protective layer, so that the protective layer surely draws the deterioration products in the pocket.

When the hydrophilic organic compound is a small molecular-weight substance, it is likely to exhibit deliquescence, and hence the hydrophilic portion of the protective layer formed on the surface of the image carrier cannot be isolated, so that fluctuations are caused in the surface resistance of the image carrier, leading to a lowering of the image quality. On the other hand, when the hydrophilic organic compound has too large weight average molecular weight, it is hardly miscible with the amphiphilic organic compound during the formation of a protective layer, making it difficult to apply the protective agent component onto the image carrier satisfactorily uniformly to form a coating layer. In this state, the protection effect for the image carrier surface cannot be uniformly exhibited.

(Amphiphilic Organic Compound)

Examples of the amphiphilic organic compounds include anionic surfactants, cationic surfactants, amphoteric surfactants, and nonionic surfactants. These can be used individually or in combination.

Examples of the anionic surfactants include compounds having at the end of the hydrophobic site an anion bonded to an alkali metal ion, such as sodium or potassium; an alkaline earth metal ion, such as magnesium or calcium; a metal ion, such as aluminum or zinc; or an ammonium ion, for example, alkylbenzenesulfonates, α-olefinsulfonates, alkanesulfonates, alkyl sulfate salts, alkyl sulfate polyoxyethylene salts, alkyl phosphate salts, long-chain fatty acid salts, α-sulfofatty acid ester salts, and alkyl ether sulfates.

Examples of the cationic surfactants include compounds having at the end of the hydrophobic site a cation bonded to chlorine, fluorine, bromine, a phosphoric acid ion, a nitric acid ion, a sulfuric acid ion, a thiosulfuric acid ion, a carbonic acid ion, or a hydroxyl ion, for example, alkyltrimethylammonium salts, dialkylmethylammonium salts, and alkyldimethylbenzylammonium salts.

Examples of the amphoteric surfactants include dimethylalkylamine oxides, N-alkylbetaines, imidazoline derivatives, and alkylamino acids.

Examples of the nonionic surfactants include alcohol compounds, ether compounds, and amide compounds, for example, long-chain alkyl alcohols, alkyl polyoxyethylene ethers, polyoxyethylene alkyl phenyl ethers, fatty acid diethanolamides, alkyl polyglucoxides, and polyoxyethylene sorbitan alkyl esters. Preferred examples include ester compounds of a long-chain alkylcarboxylic acid, such as lauric acid, palmitic acid, stearic acid, behenic acid, lignoceric acid, cerotic acid, montanic acid, or melissic acid, with a polyhydric alcohol, such as ethylene glycol, propylene glycol, glycerol, erythritol, or hexitol, or a partial anhydride thereof.

As mentioned above, examples of the amphiphilic organic compounds include anionic surfactants, cationic surfactants, amphoteric surfactants, nonionic surfactants, and composites thereof. However, the protective agent forms a protective layer on the image carrier as mentioned above, and is subjected to the image forming, and therefore, from the viewpoint of preventing the amphiphilic organic compound from adversely affecting the electrical properties of the image carrier, it is particularly preferred that the amphiphilic organic compound is a nonionic surfactant.

When using a nonionic surfactant as the amphiphilic organic compound, the surfactant itself does not ionically dissociate, and hence, even when the use environment, particularly humidity markedly changes, a leakage of charges due to air discharge can be prevented, making it possible to keep the image quality high.

As the nonionic surfactant, preferred is an ester compound of a polyhydric alcohol and an alkylcarboxylic acid represented by Structural formula (1). When using this nonionic surfactant, the nonionic surfactant and the hydrophobic organic compound together form a stable compatible state upon being melted or a stable dispersed or partial solid solution state after being solidified, thus easily achieving uniform production quality.

$$C_nH_{2n+1}COOH \quad (1)$$

where, n is the number of carbon atoms, and is an integer 15 to 35, preferably 16 to 25.

When n is less than 15, the resultant ester does not exhibit satisfactory hydrophobicity, leading to image blur or smudge due to a leakage of latent image charges particularly in an environment at a high temperature and a high humidity. When n is more than 35, the material is likely to be highly crystalline and is possibly partially crystallized during the shaping of the protective agent, so that the density uniformity is lowered and uniform application is difficult, causing application unevenness and leading to image unevenness.

Examples of the alkylcarboxylic acids represented by Structural formula (1) include normal palmitic acid (n=15), normal margaric acid (n=16), normal stearic acid (n=17), normal arachidic acid (n=19), normal behenic acid (n=21), normal lignoceric acid (n=23), normal cerotic acid (n=25), normal montanic acid (n=27), normal melissic acid (n=29), isostearic acid (n=17), and substitution products thereof. These can be used individually or in combination.

It is preferred that a linear alkylcarboxylic acid is used as the alkylcarboxylic acid represented by Structural formula (1). In this case, the hydrophobic portion of the amphiphilic organic compound is easily arranged on the surface of the image carrier onto which the amphiphilic organic compound is adsorbed, so that the adsorption density onto the surface of the carrier increases.

The number of the alkylcarboxylic acid sites per one molecule of the alkylcarboxylic acid ester indicates hydrophobicity, and the ester having the larger number prevents the dissociating substance caused due to air discharge from adsorbing on the surface of the image carrier and is effective in reducing the electrical stresses on the surface of the image carrier in the charged region. When the ratio of the alkylcarboxylic acid ester is too large, the portion of polyhydric alcohol exhibiting hydrophilicity is likely to be covered by the ester, so that satisfactory adsorption performance cannot be exhibited according to the surface state of the image carrier.

Therefore, it is preferred that the average ester linkage number per one molecule of the amphiphilic organic compound is 1 to 3. The average ester linkage number per one molecule of the amphiphilic organic compound can be controlled by selecting one or more compounds from a plurality of amphiphilic organic compounds having different ester linkage numbers and mixing them.

With respect to the ester of the alkylcarboxylic acid, there is no particular limitation, and it can be appropriately selected depending on the purpose. Examples include glyceryl alkylcarboxylates and substitution products thereof, such as glyceryl monostearate, glyceryl distearate, glyceryl monopalmitate, glyceryl dilaurate, glyceryl trilaurate, glyceryl dipalmitate, glyceryl tripalmitate, glyceryl dimyristate, glyceryl trimyristate, glyceryl palmitate stearate, glyceryl monoarachidate, glyceryl diarachidate, glyceryl behenate, glyceryl stearate behenate, glyceryl cerotate stearate, glyceryl monomontanate, and glyceryl monomelissate; and sorbitan alkylcarboxylates and substitution products thereof, such as sorbitan monostearate, sorbitan tristearate, sorbitan monopalmitate, sorbitan dipalmitate, sorbitan tripalmitate, sorbitan dimyristate, sorbitan trimyristate, sorbitan palmitate stearate, sorbitan monoarachidate, sorbitan diarachidate, sorbitan monobehenate, sorbitan stearate behenate, sorbitan cerotate stearate, sorbitan monomontanate, and sorbitan monomelissate.

Further examples of the esters of the alkylcarboxylic acid include esters of an unsaturated aliphatic carboxylic acid. However, these are not preferred because the unsaturated bond portion possibly oxidizes in air spontaneously and changes in properties or generates heat.

When using an alkylcarboxylic acid having a branched structure, the protective agent cannot adsorb on the surface of the image carrier with a satisfactorily large adsorption density due to the steric hindrance of the alkyl chain. Therefore, it is preferred that the alkylcarboxylic acid is a linear alkylcarboxylic acid.

The amphiphilic organic compound should adsorb onto the surface of the image carrier and also draw the protective agent deterioration component to make the surface hydrophobic. For isolating the protective agent, which has deteriorated due to electrical stresses, in the form of a colloid such that the protective agent is drawn in the hydrophilic organic compound and surrounded by the amphiphilic organic compound, it is important to control the hydrophile-lipophile balance (HLB) of the amphiphilic organic compound, and the HLB is preferably 1.0 to 5.0. When the HLB of the amphiphilic organic compound is in this range, the resultant colloid is advantageously more stable with respect to the humidity.

The HLB indicates the degree of affinity of a surfactant with water or oil (organic compound insoluble in water). The larger the HLB, the higher the affinity with water. The HLB can be determined from the following Kawakami's equation:

$$HLB = 7 + 11.7 \times \log(Mw/Mo)$$

where Mw is a molecular weight of the hydrophilic portion, Mo is a molecular weight of the lipophilic group, and log is a common logarithm.

The total amount of the hydrophilic organic compound and the amphiphilic organic compound is preferably 75% to 100% by mass, and more preferably 85% to 100% by mass, based on the weight of the protective agent. When the total amount is in this range, contamination of the charging member is prevented and the protecting effect is satisfactorily exhibited. When the total amount is less than 75% by mass, a component other than the hydrophilic organic compound and amphiphilic organic compound possibly occupies a large region in a cluster form in the protective layer on the surface of the image carrier, so that the resultant protective layer is not homogeneous. In this state, the protective agent component is not homogeneous and thus the protecting performance is not uniform, so that the image carrier locally deteriorates, restricting the use life.

According to the embodiment, a filler can be used for controlling the protective agent consumption or improving the protective agent in processability.

The protective agent is used near the image carrier placed in the image forming apparatus, and, when being continuously used, the protective agent is often exposed to an atmosphere at a temperature higher than room temperature due to the heat generated from a heat source, such as a driving system. Therefore, for maintaining the form of the protective agent being used, it is preferred that the protective agent composition does not suffer a change in phase, such as melting, at a certain temperature or less.

Simultaneously, for surely protecting the surface of the image carrier from electrical stresses, it is preferred that the protective agent spreads on the surface of the image carrier to form a protective layer. For achieving this, it is preferred that the molecular interaction of the protective agent composition is not high.

When the molecular interaction is high, large energy is needed to change the structure in phase once formed, and the endothermic peak generation temperature as measured by, for example, a differential thermal analyzer is high. Therefore, for surely achieving excellent spreadability upon forming a protective layer while maintaining the form of the protective agent, it is preferred that the protective agent has at least one endothermic peak temperature in the range of 50° C. to 130° C. (preferably 50° C. to 120° C.).

When the hydrophilic organic compound and the amphiphilic organic compound together form a state of the complete solid solution in the protective agent, the deterioration component of the protective agent is unlikely to be drawn in the pocket of the hydrophilic organic compound, and therefore it is preferred that the hydrophobic organic compound is dispersed in the amphiphilic organic compound. When both the hydrophilic organic compound and the amphiphilic organic compound are heat-melted, this state is achieved by increasing the difference in endothermic peak temperature between them so that there is a difference in solidifying temperature. Alternatively, the state is more easily achieved with high controllability by selecting a substance having no melting point as the hydrophilic organic compound.

The endothermic peak temperature means a temperature at the position of endothermic peak in a differential thermal profile in the temperature elevation using a differential thermal analyzer.

As a method for shaping the protective agent into a certain form, such as a prism form or a cylinder form, a known shaping method for solid substance can be used, and examples include a melt molding method, a powder molding method, a hot press molding method, cold isotropic pressing (CIP), and hot isotropic pressing.

In the melt molding method, specifically, a predetermined amount of the melted protective agent is placed in a die having a predetermined form preheated to the melt temperature of the protective agent or higher, and, if necessary, maintained at a temperature of the melting point or higher for a certain period of time, and then cooled by allowing it to stand or slow cooling to obtain a shaped article. For removing internal strain of the shaped article, in the cooling, the shaped article can be cooled to a temperature lower than the phase transition temperature of the protective agent and then heated again rapidly to a temperature of the phase transition temperature or higher.

The shaped article is cooled to a temperature near room temperature and then removed from the die to obtain a shaped article of the protective agent. The shape of the protective agent can be then adjusted by, for example, cutting. With respect to the die, from the viewpoint of achieving excellent heat conduction and excellent dimensional accuracy, a die made of a metal, such as a steel material, stainless steel, or aluminum, is preferred. For improving the releasability, it is preferred that the inner wall of the die is coated with a release agent, such as a fluororesin or a silicone resin.

FIG. 1 is a schematic diagram of a protective-layer forming device 2 that forms a protective layer formed of a protective agent 21 according to an embodiment of the present invention.

The protective-layer forming device 2 is arranged to face a photoconductor 1 (image carrier), and includes a protective-agent feeding member 22, a pressure applying member 23, and a protective-layer forming member 24.

The protective-agent feeding member 22 is of, for example, a brush form, and feeds the protective agent 21 to the surface of photoconductor 1. Specifically, the protective-agent feeding member 22 rotates at a linear velocity different from that of the photoconductor 1, and comes in contact with the photoconductor 1 to feed the protective agent 21 on the surface thereof to the surface of the photoconductor 1.

The pressure applying member 23 presses the protective agent 21 so that the protective agent 21 is in contact with the protective-agent feeding member 22. The protective-layer forming member 24 forms a thin layer of the protective agent 21.

The protective-layer forming member 24 can also serve as a cleaning mechanism 4; however, to reliably form a protective layer, it is preferred that the protective-layer forming device 2 includes the cleaning mechanism 4 that preliminarily removes a residue such as residual toner on the photoconductor 1 to prevent the residue from being mixed into the protective layer.

The protective agent 21 fed to the surface of the photoconductor 1 cannot form a satisfactory protective layer depending on the type of the substance selected. Therefore, the protective-layer forming member 24 includes, for example, a blade for forming a thin layer of the protective agent 21 to achieve a more uniform protective layer.

The photoconductor 1 having the protective layer formed thereon is placed in contact with or close to a charging roller (static charger) 3 to which a direct current (DC) voltage or a voltage obtained by superimposing an alternating current (AC) voltage on a DC voltage is applied by, for example, a high-voltage power source (not shown) to charge the photoconductor 1 due to discharge caused in a fine gap. At this time, part of the protective layer decomposes or oxidizes due to electrical stresses, or air discharge products adhere to the surface of the protective layer. Such decomposition products, oxides, or air discharge products are generally hydrophilic or contain a hydrophilic group.

The protective agent 21 includes an amphiphilic organic compound having a hydrophilic portion and a hydrophobic portion in the molecule thereof and a hydrophilic organic compound as constituents. Therefore, the amphiphilic organic compound adsorbs on a portion of the surface of the photoconductor 1, which is hydrophilic due to electrical stresses, to render the surface hydrophobic, thus preventing the electrical stresses from being directly exerted on the surface of the photoconductor 1. On the other hand, part of the protective agent 21 is exposed to electrical stresses and deteriorates, and thus partially becomes hydrophilic. However, this portion is surrounded by the excess hydrophilic pockets and dispersed in the protective layer. Therefore both the photoconductor 1 protection effect of the protective layer and the removal of deterioration products of the protective agent 21 can be achieved.

The protective agent 21 which has deteriorated is removed by a cleaning mechanism together with residual toner and others remaining on the photoconductor 1. The protective-layer forming member 24 can also be used as the cleaning mechanism 4. However, there is a difference in appropriate frictional state between the removal of the residue on the surface of the photoconductor 1 and the formation of the protective layer. Therefore, it is preferred that, as shown in FIG. 1, the protective-layer forming device 2 separately includes the cleaning mechanism 4 including a cleaning member 41 and a cleaning pressing mechanism 42 on the upstream of the protective-agent feeding member 22.

With respect to the material for the blade of the protective-layer forming member 24, there is no particular limitation, and it can be appropriately selected depending on the purpose from known materials for a blade, and examples include urethane rubbers, hydrin rubbers, silicone rubbers, and fluororubbers. These can be used individually or in combination. In the blade, the contact portion with the photoconductor 1 can be coated or impregnated with a material having a low coefficient of friction. For controlling the hardness of the elastic material, filler, such as organic filler or inorganic filler, can be dispersed.

The blade is fixed to a blade support by an arbitrary method, such as bonding or melting, so that the edge portion can be pressed to be in contact with the surface of the photoconductor 1. The thickness of the blade can be appropriately selected depending on the force applied by pressing. The thickness is preferably 0.5 millimeter to 5 millimeters, and more preferably 1 millimeter to 3 millimeters.

The length of the blade with which the blade can extend or deflect from the support, i.e., so-called free length can be appropriately selected depending on the force applied by pressing. The free length is preferably 1 millimeter to 15 millimeters, and more preferably 2 millimeters to 10 millimeters.

The blade for forming a protective layer can be an elastic metal blade, such as a metal leaf, having a covering layer of resin, rubber, or elastomer formed on the surface by a coating or dipping method, if necessary, through, for example, a coupling agent or a primer component, which layer is, if necessary, subjected to, for example, heat curing and further surface polishing.

The covering layer includes at least a binder resin and filler, and an additional component, as necessary. With respect to the binder resin, there is no particular limitation, and it can be appropriately selected depending on the purpose, and examples include fluororesins, such as PFA, PTFE, FEP, and PVdF; fluororubbers; and silicone elastomers, such as methylphenylsilicone elastomers.

The elastic metal blade preferably has a thickness of 0.05 millimeter to 3 millimeters, and more preferably 0.1 millimeter to 1 millimeter. For preventing the elastic metal blade from suffering torsion, the blade can be subjected to, for example, bending processing in the direction substantially parallel to the support axis of the fixed blade.

The pressing force applied to the photoconductor 1 by the protective-layer forming member 24 is such that the protective agent 21 can spread to form a protective layer. The force is preferably 5 gf/cm to 80 gf/cm, and more preferably 10 gf/cm to 60 gf/cm, in terms of a linear pressure.

A brush-form member is preferably used as the protective-agent feeding member 22. In this case, for suppressing mechanical stresses on the surface of the photoconductor 1, it is preferred that the brush fibers have flexibility. With respect to the material for the flexible brush fibers, there is no particular limitation, and it can be appropriately selected depending on the purpose. Examples include polyolefin resins (such as polyethylene and polypropylene); polyvinyl resins and polyvinylidene resins (such as polystyrene, acrylic resins, polyacrylonitrile, polyvinyl acetate, polyvinyl alcohol, polyvinyl butyral, polyvinyl chloride, polyvinyl carbazole, polyvinyl ether, and polyvinyl ketone); vinyl chloride-vinyl acetate copolymers; styrene-acrylic acid copolymers; styrene-butadiene resins; fluororesins (such as polytetrafluoroethylene, polyvinyl fluoride, polyvinylidene fluoride, and polychlorotrifluoroethylene); polyester; nylon; acryl; rayon; polyurethane; polycarbonate; phenolic resins; and amino resins (such as urea-formaldehyde resins, melamine resins, benzoguanamine resins, urea resins, and polyamide resins).

For controlling the flexibility, for example, a diene rubber, a styrene-butadiene rubber (SBR), an ethylene propylene rubber, an isoprene rubber, a nitrile rubber, a urethane rubber, a silicone rubber, a hydrin rubber, or a norbornene rubber can be mixed into the material.

As examples of supports of the protective-agent feeding member 22 can be cited a fixed support and a rotatable roll-form support. As an example of the roll-form feeding member, there can be mentioned a roll brush formed by, for example, spirally winding a tape made of pile fabric of brush fibers around a core made of a metal. It is preferred that the brush fibers have a fiber diameter of about 10 micrometers to 500 micrometers, a length of 1 millimeter to 15 millimeters, and a brush density of 10,000 to 300,000 fibers per square inch ($1.5 \times 10^7$ to $4.5 \times 10^8$ fibers per square meter).

From the viewpoint of achieving excellent feeding uniformity and stability, it is preferred to use the protective-agent feeding member 22 having a high brush density, and it is preferred that one brush fiber is formed from several to several hundred filaments. For example, it is preferred that 333 dtex=6.7 dtex×50 filaments (300 deniers=6 deniers×50 filaments), i.e., 50 filaments with 6.7 dtex (6 deniers) are filled as one fiber.

For stabilizing the surface form of the brush or achieving environmental stability, a covering layer can be formed the surface of the brush if necessary. As a constituent of the covering layer, a covering layer constituent deformable depending on the deflection of brush fibers is preferably used. With respect to the covering layer constituent, there is no particular limitation as long as it is a material that can keep flexibility, and it can be appropriately selected depending on the purpose. Examples include polyolefin resins, such as polyethylene, polypropylene, chlorinated polyethylene, and chlorosulfonated polyethylene; polyvinyl or polyvinylidene resins, such as polystyrene, acryl (for example, polymethyl methacrylate), polyacrylonitrile, polyvinyl acetate, polyvinyl alcohol, polyvinyl butyral, polyvinyl chloride, polyvinyl carbazole, polyvinyl ether, and polyvinyl ketone; vinyl chloride-vinyl acetate copolymers; silicone resins made of an organosiloxane bond or modified resins thereof (resins modified with, for example, an alkyd resin, a polyester resin, an epoxy resin, or a polyurethane resin); fluororesins, such as perfluoroalkyl ether, polyvinyl fluoride, polyvinylidene fluoride, and polychlorotrifluoroethylene; polyamide; polyester; polyurethane; polycarbonate; amino resins, such as urea-formaldehyde resins; and epoxy resins, and composite resins thereof.

Figure 2:
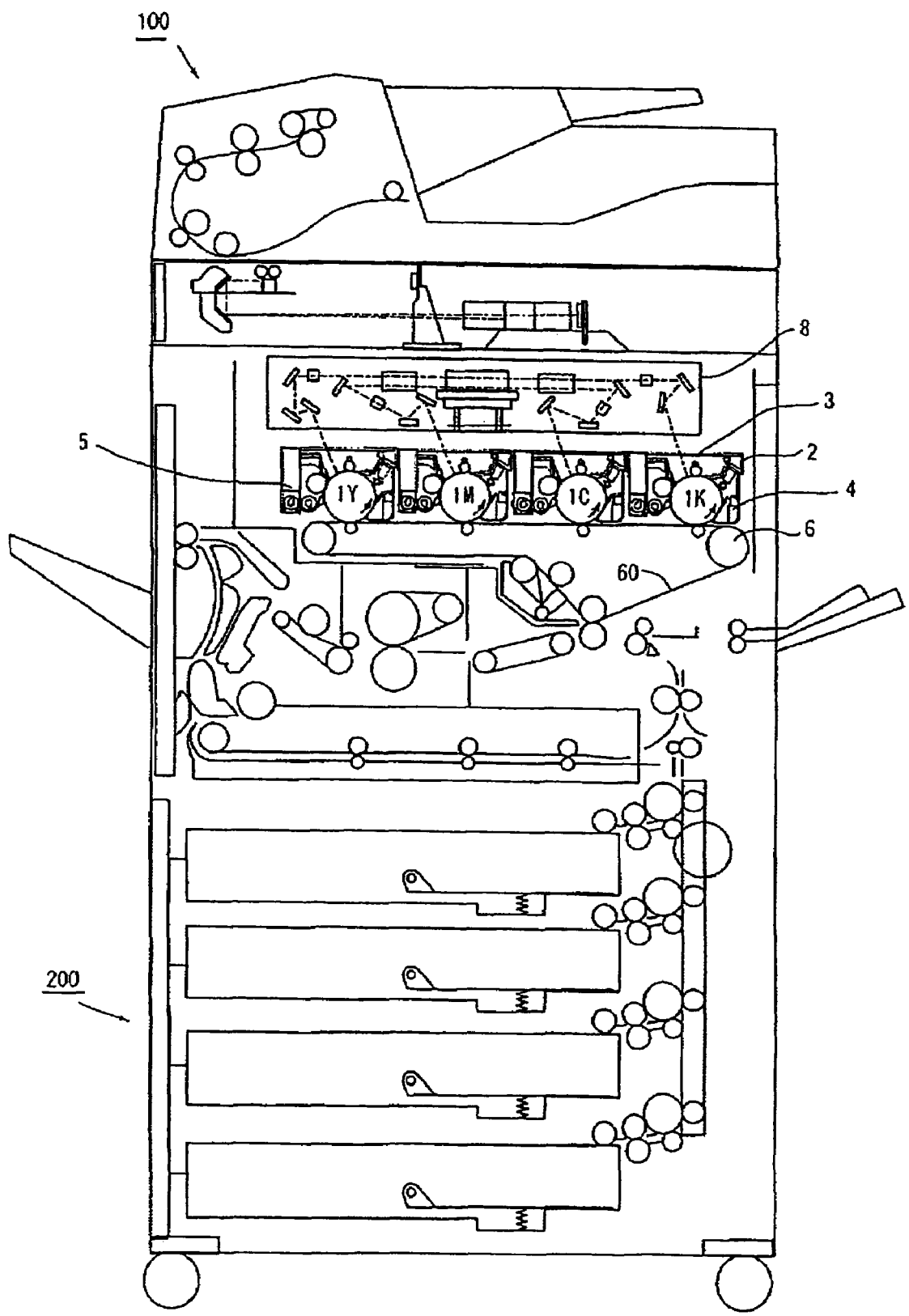
FIG. 2 is a schematic diagram of an image forming apparatus according to an embodiment of the present invention.

FIG. 2 is a schematic diagram of an image forming apparatus 100 according to an embodiment of the present invention.

The image forming apparatus 100 includes an photoconductor 1 (1Y, 1M, 1C, 1K), around which are arranged the protective-layer forming device 2, the static charger 3, an image-forming device 8, a developing device 5, and a transfer device 6. The image forming apparatus 100 further includes a fixing unit, and additional units appropriately selected as necessary, for example, a destaticizing unit, a recycling unit, and a control unit, and preferably the cleaning mechanism 4.

The image-forming process performed by the image forming apparatus 100 is described next taking negative-positive process as an example.

An organic photoconductor (OPC) having an organic photoconductive layer, which is a representative example of the photoconductor 1 (1Y, 1M, 1C, 1K), is destaticized by, for example, a destaticizing unit such as a destaticizing lamp (not shown), and uniformly negatively charged by the static charger 3 including a charging member.

In charging the photoconductor 1 by the static charger 3, an appropriate voltage for charging the photoconductors 1Y, 1M, 1C, 1K to a desired potential or a charging voltage obtained by superimposing an AC voltage on the above voltage is applied to the charging member from a voltage applying mechanism (not shown).

The charged photoconductors 1Y, 1M, 1C, 1K are irradiated with a laser beam from the image-forming device 8, such as a laser optical system, to form a latent image (the absolute value of potential of the exposed portion is lower than the absolute value of potential of the unexposed portion).

A light source, such as semiconductor laser, emits the laser beam, and scans the surface of the photoconductors 1Y, 1M, 1C, 1K with the laser beam in the direction of the revolving shaft of the photoconductors 1Y, 1M, 1C, 1K by, for example, a polygonal prism (polygon) mirror rotating at a high speed.

The thus formed latent image is developed by the developing device 5 with toner particles or a mixture of toner particles and carrier particles fed onto a development sleeve, which is a developer carrier.

In developing the latent image, an appropriate voltage between the exposed portion and the unexposed portion of the photoconductors 1Y, 1M, 1C, 1K or a development bias obtained by superimposing an AC voltage on the above voltage is applied to the development sleeve from a voltage applying mechanism (not shown).

The toner images of different colors formed on the photoconductors 1Y, 1M, 1C, 1K are transferred onto an intermediate transfer member 60 by the transfer device 6, and the toner image is transferred onto a recording medium, such as paper, fed by a paper feeding mechanism 200.

At this time, it is preferred that a potential with polarity opposite the charge of the toner is applied as a transfer bias to the transfer device 6. The intermediate transfer member 60 is then separated from the photoconductor 1.

The toner particles remaining on the photoconductor 1 are removed to a toner-recovery chamber by the cleaning mechanism 4.

The image forming apparatus 100 can be the one in which a plurality of toner images of different colors are successively formed by a plurality of developing devices and successively transferred onto an intermediate transfer member, and then fed to a fixing mechanism where the toner images are fixed by, for example, heat, or the one in which a plurality of toner images similarly formed are successively transferred onto an intermediate transfer member, and then transferred at the same time to a recording medium, such as paper, followed by similar fixing.

The static charger 3 is preferably in contact with or close to the surface of the photoconductor 1, and a discharge wire is used. In this case, the ozone amount generated during the charging can be reduced as compared to the amount generated in a corona discharging device called corotron or scorotron.

In the static charger 3 with the charging member in contact with or close to the surface of the photoconductor 1, discharging occurs in a region near the surface of the photoconductor 1 as mentioned above, and therefore, electrical stresses on the photoconductor 1 tend to increase. In contrast, according to the embodiment, the protective-layer forming device 2 forms a thin layer of the protective agent to prevent the photoconductor 1 from deteriorating for a long term. This suppresses a change in an image with time or due to the use environment, thus achieving stable image quality.

As mentioned above, the image forming apparatus 100 has an excellent acceptance range with respect to the change of the surface state of the photoconductor 1, particularly to the presence of a low resistance portion on the surface, and has a construction such that the fluctuations in charging performance for the photoconductor 1 are suppressed, and therefore, when using the image forming apparatus 100 and toner having the construction mentioned above in combination, an high-quality image can be stably formed for a long term.

In the following, the constituent elements of the image forming apparatus 100, and toner for use are explained in detail.

The image-forming device 8 forms an electrostatic latent image on the photoconductor 1. With respect to the material, form, structure, size, and others of the photoconductor 1, there is no particular limitation, and they can be appropriately selected from those conventionally known. Preferred examples of forms of the photoconductor 1 include a drum form, and examples of materials for the photoconductor 1 include inorganic photoconductors, such as amorphous silicon and selenium, and organic photoconductors, such as polysilane and phthalopolymethyne.

The photoconductor 1 includes a conductive support and at least a photoconductive layer on the conductive support, and an additional layer, as necessary.

The photoconductive layer is of a single layer type including a combination of a charge generating material and a charge transport material, a normal layer type including a charge transport layer formed on a charge generating layer, or a reversed layer type including a charge generating layer formed on a charge transport layer. For improving the photoconductor in mechanical strength, wear resistance, gas resistance, and cleaning properties, the outermost surface layer can be formed on the photoconductive layer. An undercoat layer can be formed between the photoconductive layer and the conductive support. If necessary, for example, a plasticizer, an antioxidant, or a leveling agent can be added to each layer in an appropriate amount.

With respect to the conductive support, there is no particular limitation as long as it exhibits electrical conduction such that it has a volume resistance of $1.0 \times 10^{10}$ Ω·cm or less, and it can be appropriately selected depending on the purpose, and there can be used, for example, a film-form or cylindrical plastic or paper coated with a metal, such as aluminum, nickel, chromium, dichromate, copper, gold, silver, or platinum, or a metal oxide, such as tin oxide or indium oxide, by vapor deposition or sputtering, or a plate of aluminum, an aluminum alloy, nickel, or stainless steel, or a tube formed from the plate into a drum by an extrusion or drawing method and then subjected to surface treatment, such as cutting, super finishing, or polishing.

The drum-formed support preferably has a diameter of 20 millimeters to 150 millimeters, more preferably 24 millimeters to 100 millimeters, and further preferably 28 millimeters to 70 millimeters. When the diameter of the drum-formed support is less than 20 millimeters, it is physically difficult to place the charging, exposure, developing, transferring, and cleaning devices around the drum. On the other hand, when the diameter is more than 150 millimeters, the image forming apparatus tends to be increased in size. Particularly, when the image forming apparatus is of a tandem type, a plurality of photoconductors must be arranged, and therefore the diameter is preferably equal to or smaller than 70 millimeters, and more preferably equal to or smaller than 60 millimeters. An endless nickel belt or endless stainless steel belt disclosed in Japanese Patent Application Laid-Open No. S52-36016 can be used as the conductive support.

The undercoat layer for the photoconductor can be a single layer or a multilayers. Examples of undercoat layers include a layer formed mainly of a resin, a layer formed mainly of a white pigment and a resin, and a metal oxide film obtained by chemically or electrochemically oxidizing the surface of a conductive support. Among these, preferred is an undercoat layer formed mainly of a white pigment and a resin.

Examples of the white pigments include metal oxides, such as titanium oxide, aluminum oxide, zirconium oxide, and zinc oxide, and, of these, particularly preferred is titanium oxide, because it advantageously prevents charge injection from the conductive support.

Examples of the resins include thermoplastic resins, such as polyamide, polyvinyl alcohol, casein, and methyl cellulose; and thermosetting resins, such as acryl, phenol, melamine, alkyd, unsaturated polyester, and epoxy. These can be used individually or in combination.

With respect to the thickness of the undercoat layer, there is no particular limitation, and it can be appropriately selected depending on the purpose, and is preferably 0.1 micrometer to 10 micrometers, and more preferably 1 micrometer to 5 micrometers.

Examples of charge generating substances in the photoconductive layer include organic pigments or dyes, such as azo pigments, for example, monoazo pigments, bisazo pigments, trisazo pigments, and tetrakisazo pigments, triarylmethane dyes, thiazine dyes, oxazine dyes, xanthene dyes, cyanine dyes, styryl dyes, pyrylium dyes, quinacridone pigments, indigo pigments, perylene pigments, polycyclic quinone pigments, bisbenzimidazole pigments, indanthron pigments, squarylium pigments, and phthalocyanine pigments; and inorganic materials, such as selenium, selenium-arsenic, selenium-tellurium, cadmium sulfide, zinc oxide, titanium oxide, and amorphous silicon. These can be used individually or in combination.

Examples of charge transport substances in the photoconductive layer include anthracene derivatives, pyrene derivatives, carbazole derivatives, tetrazole derivatives, metallocene derivatives, phenothiazine derivatives, pyrazoline compounds, hydrazone compounds, styryl compounds, styrylhydrazone compounds, enamine compounds, butadiene compounds, distyryl compounds, oxazole compounds, oxadiazole compounds, thiazole compounds, imidazole compounds, triphenylamine derivatives, phenylenediamine derivatives, aminostilbene derivatives, and triphenylmethane derivatives. These can be used individually or in combination.

As a binding resin used in forming the photoconductive layer, there can be used a known, electrically insulating thermoplastic resin, thermosetting resin, photo-setting resin, or photoconductive resin. Examples of the binding resins include thermoplastic resins, such as polyvinyl chloride, polyvinylidene chloride, vinyl chloride-vinyl acetate copolymers, vinyl chloride-vinyl acetate-maleic anhydride copolymers, ethylene-vinyl acetate copolymers, polyvinyl butyral, polyvinyl acetal, polyester, phenoxy resins, (meth)acrylic resins, polystyrene, polycarbonate, polyallylate, polysulfone, polyether sulfone, and ABS resins; thermosetting resins, such as phenolic resins, epoxy resins, urethane resins, melamine resins, isocyanate resins, alkyd resins, silicone resins, and thermosetting acrylic resins; polyvinyl carbazole; polyvinyl anthracene; and polyvinyl pyrene. These can be used individually or in combination.

Examples of the antioxidants include phenolic compounds, paraphenylenediamines, organosulfur compounds, and organophosphorus compounds.

Examples of the phenolic compounds include 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl) propionate]methane, bis[3,3'-bis(4'-hydroxy-3'-t-butylphenyl)butyric acid] glycol ester, and tocopherols.

Examples of the paraphenylenediamines include N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, and N,N'-dimethyl-N,N'-di-t-butyl-p-phenylenediamine.

Examples of the hydroquinones include 2,5-di-t-octylhydroquinone, 2,6-didodecylhydroquinone, 2-dodecylhydroquinone, 2-dodecyl-5-chlorohydroquinone, 2-t-octyl-5-methylhydroquinone, and 2-(2-octadecenyl)-5-methylhydroquinone.

Examples of the organosulfur compounds include dilauryl 3,3'-thiodipropionate, distearyl 3,3'-thiodipropionate, and ditetradecyl 3,3'-thiodipropionate.

Examples of the organophosphorus compounds include triphenylphosphine, tri(nonylphenyl)phosphine, tri(dinonylphenyl)phosphine, tricresylphosphine, and tri(2,4-dibutylphenoxy)phosphine.

These compounds are known as antioxidants for rubber, plastic, and fats and oils, and can be easily commercially available.

It is preferred that the amount of the antioxidant added is 0.01% to 10% by mass, based on the total mass of the layers to which the antioxidant is added.

As the plasticizer, a plasticizer generally used for resin, such as dibutyl phthalate or dioctyl phthalate, can be directly used, and an appropriate amount of the plasticizer used is 0 to about 30 parts by mass, relative to 100 parts by mass of the binding resin.

A leveling agent can be added to the photoconductive layer. As the leveling agent, silicone oil, such as dimethylsilicone oil or methylphenylsilicone oil; or a polymer or oligomer having a perfluoroalkyl group in its side chain is used. It is preferred that the amount of the leveling agent used is 0 to 1 part by mass, relative to 100 parts by mass of the binder resin.

The outermost surface layer of the photoconductor is formed to improve the photoconductor in mechanical strength, wear resistance, gas resistance, cleaning properties, and others. As the outermost surface layer, preferred is a layer including a polymer having mechanical strength higher than that of the photoconductive layer or a layer including a polymer having an inorganic filler dispersed therein. The resin used in the outermost surface layer can be either a thermoplastic resin or a thermosetting resin, and particularly preferred is a thermosetting resin, because it has high mechanical strength and high resistance to wear due to the friction with the cleaning blade. The surface layer having a small thickness need not have a charge transport ability. However, when the surface layer having no charge transport ability has a large thickness, lowering of the sensitivity of the photoconductor, after-exposure potential elevation, or residual potential elevation is likely to occur, and therefore it is preferred that the charge transport substance is added to the surface layer or a polymer having a charge transport ability is used in the surface layer.

Generally, there is a large difference in mechanical strength between the photoconductive layer and the outermost surface layer, and hence, the outermost surface layer wears away due to the friction with the cleaning blade and then the photoconductive layer wears immediately. Therefore, when the outermost surface layer is formed, it is important that the outermost surface layer has a satisfactory thickness, and the outermost surface layer preferably has a thickness of 0.1 micrometer to 12 micrometers, more preferably 1 micrometer to 10 micrometers, and further preferably 2 micrometers to 8 micrometers. When the thickness of the outermost surface layer is less than 0.1 micrometer, the thin surface layer easily partially wears away due to the friction with the cleaning blade, and the photoconductive layer exposed through the worn portion wears. On the other hand, when the thickness is more than 12 micrometers, lowering of the sensitivity, after-exposure potential elevation, or residual potential elevation is likely to occur, and, particularly when a polymer having a charge transport ability is used, the polymer having a charge transport ability takes more cost.

As a resin used in the outermost surface layer, preferred is a resin having transparency with respect to the writing light used in forming an image and having excellent insulating properties, mechanical strength, and bonding properties, and examples include ABS resins, ACS resins, olefin-vinyl monomer copolymers, chlorinated polyether, allyl resins, phenolic resins, polyacetal, polyamide, polyamide-imide, polyacrylate, polyallyl sulfone, polybutylene, polybutylene terephthalate, polycarbonate, polyether sulfone, polyethylene, polyethylene terephthalate, polyimide, acrylic resins, polymethylpentene, polypropylene, polyphenylene oxide, polysulfone, polystyrene, AS resins, butadiene-styrene copolymers, polyurethane, polyvinyl chloride, polyvinylidene chloride, and epoxy resins. The above polymer can be a thermoplastic resin. However, when the polymer is a thermosetting resin having improved mechanical strength, which is crosslinked using a crosslinking agent having a polyfunctional acryloyl group, a carboxyl group, a hydroxyl group, or an amino group, the outermost surface layer is increased in mechanical strength, and thus prevented from wearing due to the friction with the cleaning blade.

It is preferred that the outermost surface layer has a charge transport ability. As examples of methods for obtaining the outermost surface layer having a charge transport ability, there can be mentioned a method in which a mixture of the polymer used in the outermost surface layer and the charge transport substance is used, and a method in which a polymer having a charge transport ability is used in the outermost surface layer, and the latter is preferred, because there can be obtained a photoconductor having high sensitivity, which is unlikely to cause after-exposure potential elevation or residual potential elevation.

As examples of the polymers having a charge transport ability can be cited polymers having a group represented by Structural formula (i) as follows:

where $Ar_1$ is an arylene group optionally having a substituent, and Ar2 and Ar3 each are an aryl group optionally having a substituent. Ar2 and Ar3 can be the same or different from each other.

It is preferred that the group having a charge transport ability is added to a side chain of a polymer having high mechanical strength, such as a polycarbonate resin or an acrylic resin, and it is particularly preferred to use an acrylic resin having excellent application properties and excellent curing properties where monomers of the acrylic resin are easily produced.

An unsaturated carboxylic acid having a group of Structural formula (i) is polymerized with the acrylic resin having a charge transport ability to form a surface layer having high mechanical strength and excellent transparency as well as high charge transport ability. When a polyfunctional unsaturated carboxylic acid, preferably a tri- or more polyfunctional unsaturated carboxylic acid is added to the monofunctional unsaturated carboxylic acid having a group of Structural formula (i), the acrylic resin forms a crosslinked structure, i.e., a thermosetting polymer, thus forming a surface layer having high mechanical strength. A group of Structural formula (i) can be added to the polyfunctional unsaturated carboxylic acid; however, the production cost for the monomers is increased, and therefore it is preferred that a group of Structural formula (i) is not added to the polyfunctional unsaturated carboxylic acid and photo-setting polyfunctional monomers are used.

Examples of monofunctional unsaturated carboxylic acids having a group represented by Structural formula (i) can be represented by Structural formula (ii) and Structural formula (iii) as follows:

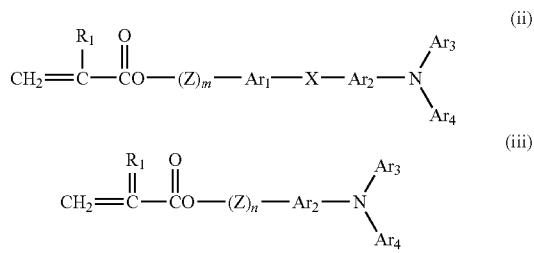

where $R_1$ can be a hydrogen atom, a halogen atom, an alkyl group optionally having a substituent, an aralkyl group optionally having a substituent, an aryl group optionally having a substituent, a cyano group, a nitro group, an alkoxy group optionally having a substituent, —$COOR_7$ (where $R_7$ represents a hydrogen atom, an alkyl group optionally having a substituent, an aralkyl group optionally having a substituent, or an aryl group optionally having a substituent), a halogenated carbonyl group, or $CONR_8R_9$ (where each of $R_8$ and $R_9$ independently represents a hydrogen atom, a halogen atom, an alkyl group optionally having a substituent, an aralkyl group optionally having a substituent, or an aryl group optionally having a substituent).

In Structural formulas (ii) and (iii), $Ar_1$ and $Ar_2$ can be the same or different, and each represent an arylene group optionally having a substituent; $Ar_3$ and $Ar_4$ can be the same or different, and each represent an aryl group optionally having a substituent; X represents a single bond, an alkylene group optionally having a substituent, a cycloalkylene group optionally having a substituent, an alkylene ether group optionally having a substituent, an oxygen atom, a sulfur atom, or a vinylene group; Z represents an alkylene group optionally having a substituent, an alkylene ether divalent group optionally having a substituent, or an alkylene oxycarbonyl divalent group optionally having a substituent; and m and n is an integer of 0 to 3.

With respect to the substituent as $R_1$ in Structural formulas (ii) and (iii), examples of alkyl groups include a methyl group, an ethyl group, a propyl group, and a butyl group. Examples of aryl groups include a phenyl group and a naphthyl group. Examples of aralkyl groups include a benzyl group, a phenethyl group, and a naphthylmethyl group. Examples of alkoxy groups include a methoxy group, an ethoxy group, and a propoxy group. These groups can be substituted by a halogen atom; a nitro group; a cyano group; an alkyl group, such as a methyl group or an ethyl group; an alkoxy group, such as a methoxy group or an ethoxy group; an aryloxy group, such as a phenoxy group; an aryl group, such as a phenyl group or a naphthyl group; or an aralkyl group, such as a benzyl group or a phenethyl group. Among these substituents as $R_1$, particularly preferred is a hydrogen atom or a methyl group.

Examples of the aryl groups as $Ar_3$ and $Ar_4$ include fused polycyclic hydrocarbon groups, non-fused cyclic hydrocarbon groups, and heterocyclic groups.

As the fused polycyclic hydrocarbon group, preferred is one having 18 carbon atoms or less forming a ring, and examples include a pentanyl group, an indenyl group, a naphthyl group, an azulenyl group, a heptalenyl group, a biphenylenyl group, an as-indanthrenyl group, an s-indanthrenyl group, a fluorenyl group, an acenaphthylenyl group, a pleiadenyl group, an acenaphthenyl group, a phenalenyl group, a phenanthryl group, an anthryl group, a fluoranthenyl group, an acephenanthrenyl group, an aceanthrenyl group, a triphenylenyl group, a pyrenyl group, a glycenyl group, and a naphthacenyl group.

Examples of the non-fused cyclic hydrocarbon groups include monovalent groups of monocyclic hydrocarbon compound, such as benzene, diphenyl ether, polyethylene diphenyl ether, diphenyl thioether, and diphenyl sulfone; monovalent groups of non-fused polycyclic hydrocarbon compound, such as biphenyl, polyphenyl, diphenylalkane, diphenylalkene, diphenylalkyne, triphenylmethane, distyrylbenzene, 1,1-diphenylcycloalkane, polyphenylalkane, and polyphenylalkene; and monovalent groups of ring assembly hydrocarbon compound, such as 9,9-diphenylfluorene.

Examples of the heterocyclic groups include monovalent groups, such as carbazole, dibenzofuran, dibenzothiophene, oxadiazole, and thiadiazole.

The content of the polyfunctional unsaturated carboxylic acid in the outermost surface layer is preferably 5% to 75% by mass, more preferably 10% to 70% by mass, and further preferably 20% to 60% by mass. When the content is less than 5% by mass, the outermost surface layer tends to have unsatisfactory mechanical strength. On the other hand, when the content is more than 75% by mass, cracks are likely to be formed in the outermost surface layer when strong force is applied to the surface layer, and the sensitivity is likely to deteriorate.

When an acrylic resin is used in the outermost surface layer, the unsaturated carboxylic acid is applied to the photoconductor and then can be irradiated with an electron beam or active light, such as ultraviolet light, to effect radical polymerization, forming a surface layer. When the radical polymerization using active light is conducted, an unsaturated carboxylic acid having a photopolymerization initiator dissolved therein is used. As the photopolymerization initiator, a material generally used in a photo-setting coating composition can be used.

For improving the mechanical strength of the outermost surface layer, it is preferred that the outermost surface layer contains metal particles, metal oxide particles, or other particles. Examples of the metal oxides include titanium oxide, tin oxide, potassium titanate, TiO, TiN, zinc oxide, indium oxide, and antimony oxide. Examples of other particles for improving the wear resistance include fluororesins, such as polytetrafluoroethylene, silicone resins, and these resins having an inorganic material dispersed therein.

The image-forming device 8 forms an electrostatic latent image by, for example, uniformly charging the surface of the photoconductor 1 and then subjecting the charged surface to exposure to form a latent image. The image-forming device 8 includes, for example, an exposure system that subjects the surface of the photoconductor 1 charged by the static charger 3 to exposure to form a latent image.

The static charger 3 charges the surface of the photoconductor 1 by applying a voltage thereto. With respect to the static charger 3, there is no particular limitation, and it can be appropriately selected depending on the purpose, and examples include known contact static chargers having a conductive or semi-conductive roll, brush, film, or rubber blade, and non-contact static chargers utilizing corona discharge, such as corotron or scorotron. As the static charger 3, preferred is one having a voltage applying unit that applies a voltage having an alternating component.

With respect to the exposure system, there is no particular limitation as long as it can subject the surface of the photoconductor 1 charged by the static charger 3 to exposure to form a latent image, and it can be appropriately selected depending on the purpose, and examples include a copying optical system, a rod-lens array system, a laser optical system, and a liquid-crystal shutter optical system. In the embodiment, a back light system is employed in which the back surface of the photoconductor 1 is subjected to exposure to form a latent image.

The developing device 5 develops the electrostatic latent image with toner or developer into a visible image. With respect to the developing device 5, there is no particular limitation as long as it can develop the electrostatic latent image using the toner or developer, and it can be appropriately selected from those conventionally known, and preferred examples include those having at least a developing machine containing the toner or developer and being capable of contact- or noncontact-applying the toner or developer to the electrostatic latent image.

Toner for use preferably has an average circularity of 0.93 to 1.00, and more preferably 0.95 to 0.99. The average circularity is a yardstick of the unevenness of the toner particle, and toner having a perfectly spherical form has an average circularity of 1.00, and, the more uneven the surface form of the toner, the smaller the average circularity. The average circularity is an average of circularity SR represented by Equation (1) as follows:

Circularity $SR$=(Perimeter of the circle having an area equivalent to the projected area of toner particle)/(Perimeter of the projected image of the toner particle)

When the average circularity is in the range of 0.93 to 1.00, the toner particles have a smooth surface, and the contact area between the toner particles or between the toner particles and the photoconductor is small, achieving excellent transfer properties. In addition, the toner particles have no sharp edges, and hence the stirring torque for the developer in a developing machine is small and the stirring is stable, causing no image defects. There are no toner particles having sharp edges in the toner forming dots, and hence a pressure is evenly applied to the whole of the toner forming dots upon being pressed against a recording medium in the transfer, thus preventing a transfer failure. The toner particles having no sharp edges have small abrasive force and hence do not damage or abrade the surface of the photoconductor 1.

The circularity SR can be measured using, for example, a flow-type particle image analyzer (FPIA-1000, manufactured by Toa medical electronics Co., Ltd.).

0.1 milliliter to 0.5 milliliter of a surfactant (preferably an alkylbenzenesulfonate) as a dispersant is first added to 100 milliliters to 150 milliliters of water contained in a container, from which impurity solids are preliminarily removed, and then about 0.1 gram to 0.5 gram of a measurement sample is added. The resultant suspension having the sample dispersed is subjected to dispersion treatment by an ultrasonic dispersing machine for about 1 minute to 3 minutes, and subjected to measurement of the form and particle size of toner by the above analyzer at a dispersion concentration of 3,000 to 10,000 particles/μl.

The toner preferably has a weight average particle diameter (D4) of 3 micrometers to 10 micrometers, and more preferably 4 micrometers to 8 micrometers. In this range, the toner has toner particles having a particle diameter even smaller than the fine latent image dots, and hence exhibits excellent dot reproducibility. When the weight average particle diameter (D4) is less than 3 micrometers, a problem that the transfer efficiency is lowered or the blade cleaning properties become poor is likely to occur. On the other hand, when the weight average particle diameter (D4) is more than 10 micrometers, it is difficult to suppress splash of characters or lines.

The ratio of the weight average particle diameter (D4) to the number average particle diameter (D1) of the toner (D4/D1) is preferably 1.00 to 1.40, and more preferably 1.00 to 1.30. The toner having a ratio (D4/D1) close to 1 has a sharp particle size distribution, and, when the ratio (D4/D1) is in the range of from 1.00 to 1.40, selective development due to the toner particle diameter is not caused, achieving excellent stability of the image quality. The particle size distribution of the toner is sharp and hence the frictional charge amount distribution is also sharp, thus preventing the occurrence of fogging. Further, when the toner particle diameter is uniform, development is made so that the toner particles are arranged densely in an orderly manner with respect to the latent image dots, achieving excellent dot reproducibility.

The measurement of the weight average particle diameter (D4) and particle size distribution of the toner is conducted by, for example, a Coulter counter method. Examples of measurement machines for particle size distribution of the toner particles by the Coulter counter method include Coulter Counter TA-II and Coulter Multisizer II (each manufactured by Beckman Coulter, Inc.).

As a dispersant, 0.1 milliliter to 5 milliliters of a surfactant (preferably, alkylbenzenesulfonate) is first added to 100 milliliters to 150 milliliters of an aqueous electrolytic solution. The electrolytic solution is an about 1% aqueous NaCl solution prepared using first grade sodium chloride, for example, ISOTON-II (manufactured by Beckman Coulter, Inc.) can be used. Then, 2 milligrams to 20 milligrams of a measurement sample is added to the solution. The resultant electrolytic solution having the sample suspended is subjected to dispersion treatment by an ultrasonic dispersing machine for about 1 minute to 3 minutes, and the volume and number of the toner particles or toner are measured by the measurement machine using a 100 micrometers aperture as an aperture to determine volume distribution and number distribution by calculation. From the distribution obtained, a weight average particle diameter (D4) and a number average particle diameter (D1) of the toner can be determined.

As channels are used 13 channels of 2.00 micrometers to less than 2.52 micrometers; 2.52 micrometers to less than 3.17 micrometers; 3.17 micrometers to less than 4.00 micrometers; 4.00 micrometers to less than 5.04 micrometers; 5.04 micrometers to less than 6.35 micrometers; 6.35 micrometers to less than 8.00 micrometers; 8.00 micrometers to less than 10.08 micrometers; 10.08 micrometers to less than 12.70 micrometers; 12.70 micrometers to less than 16.00 micrometers; 16.00 micrometers to less than 20.20 micrometers; 20.20 micrometers to less than 25.40 micrometers; 25.40 micrometers to less than 32.00 micrometers; and 32.00 micrometers to less than 40.30 micrometers. Particles having a particle diameter of 2.00 micrometers to less than 40.30 micrometers are to be measured.

The toner having a substantially spherical form can be prepared by subjecting a toner composition including a polyester prepolymer having a functional group containing a nitrogen atom, polyester, a colorant, and a release agent to crosslinking and/or extension reaction in an aqueous medium in the presence of resin particles. In the toner prepared by this reaction, the toner surface is cured to suppress hot offset, thus preventing the pollutant of a fixing machine from appearing on the image.

Examples of the prepolymers of a modified polyester resin include polyester prepolymers (A) having an isocyanate group, and examples of compounds capable of extending or crosslinking with the prepolymer include amines (B).

Examples of polyester prepolymers (A) having an isocyanate group include polycondensation products of polyol (1) and polycarboxylic acid (2), which are reaction products of polyester having an active hydrogen group with polyisocyanate (3). Examples of active hydrogen groups in the polyester include a hydroxyl group (an alcohol hydroxyl group and a phenolic hydroxyl group), an amino group, a carboxyl group, and a mercapto group. Among these, particularly preferred is an alcohol hydroxyl group.

Examples of polyols (1) include diol (1-1) and tri- or more hydric polyol (1-2), and preferred is diol (1-1) solely or a mixture of diol (1-1) and a small amount of polyol (1-2).

Examples of diols (1-1) include alkylene glycols (such as ethylene glycol, 1,2-propylene glycol, 1,3-propylene glycol, 1,4-butanediol, and 1,6-hexanediol); alkylene ether glycols (such as diethylene glycol, triethylene glycol, dipropylene glycol, polyethylene glycol, polypropylene glycol, and polytetramethylene ether glycol); alicyclic diols (such as 1,4-cyclohexanedimethanol and hydrogenated bisphenol A); bisphenols (such as bisphenol A, bisphenol F, and bisphenol S); alkylene oxide (e.g., ethylene oxide, propylene oxide, or butylene oxide) addition products of the above alicyclic diol; and alkylene oxide (e.g., ethylene oxide, propylene oxide, or butylene oxide) addition products of the above bisphenol. Among these, preferred is an alkylene glycol having 2 to 12 carbon atoms or an alkylene oxide addition product of a bisphenol, and particularly preferred is a combination of an alkylene oxide addition product of a bisphenol and an alkylene glycol having 2 to 12 carbon atoms.

Examples of tri- or more hydric polyols (1-2) include tri- to octa- or more polyhydric aliphatic alcohols (such as glycerol, trimethylolethane, trimethylolpropane, pentaerythritol, and sorbitol); tri- or more hydric phenols (such as trisphenol PA, phenolic novolak, and cresol novolak); and alkylene oxide addition products of the tri- or more hydric polyphenol.

Examples of polycarboxylic acids (2) include dicarboxylic acids (2-1) and tri- or more functional polycarboxylic acids (2-2), and, of these, preferred is dicarboxylic acid (2-1) solely or a mixture of dicarboxylic acid (2-1) and a small amount of polycarboxylic acid (2-2).

Examples of dicarboxylic acids (2-1) include alkylenedicarboxylic acids (such as succinic acid, adipic acid, and sebacic acid); alkenylenedicarboxylic acids (such as maleic acid and fumaric acid); and aromatic dicarboxylic acids (such as phthalic acid, isophthalic acid, terephthalic acid, and naphthalenedicarboxylic acid). Among these, particularly preferred is an alkenylenedicarboxylic acid having 4 to 20 carbon atoms or an aromatic dicarboxylic acid having 8 to 20 carbon atoms.

Examples of tri- or more functional polycarboxylic acids (2-2) include aromatic polycarboxylic acids having 9 to 20 carbon atoms (such as trimellitic acid and pyromellitic acid). An anhydride or a lower alkyl ester (e.g., a methyl ester, an ethyl ester, or an isopropyl ester) of the above polycarboxylic acid (2) can be reacted with polyol (1).

The ratio of polyol (1) to polycarboxylic acid (2), i.e., the molar ratio of the hydroxyl group [OH] to the carboxyl group [COOH] {[OH]/[COOH] ratio} is preferably 2/1 to 1/1, more preferably 1.5/1 to 1/1, and further preferably 1.3/1 to 1.02/1.

Examples of polyisocyanates (3) include aliphatic polyisocyanates (such as tetramethylene diisocyanate, hexamethylene diisocyanate, and 2,6-diisocyanatomethyl caproate); alicyclic polyisocyanates (such as isophorone diisocyanate and cyclohexylmethane diisocyanate); aromatic diisocyanates (such as tolylene diisocyanate and diphenylmethane diisocyanate); aromatic aliphatic diisocyanates (such as $\alpha,\alpha,\alpha',\alpha'$-tetramethylxylylene diisocyanate); isocyanurates; and the above polyisocyanates blocked with a phenol derivative, an oxime, or a caprolactam. These can be used individually or in combination.

The ratio of polyisocyanate (3), i.e., the molar ratio of the isocyanate group [NCO] to the hydroxyl group [OH] of the polyester having a hydroxyl group {[NCO]/[OH] ratio} is preferably 5/1 to 1/1, more preferably 4/1 to 1.2/1, and further preferably 2.5/1 to 1.5/1. When the [NCO]/[OH] ratio is more than 5, the low-temperature fixing properties tend to become poor. When the [NCO] molar ratio is less than 1, the urea content of the modified polyester is too small, so that the hot offset resistance is lowered.

The content of the polyisocyanate (3) constituent in prepolymer (A) having an isocyanate group at the end is preferably 0.5% to 40% by mass, more preferably 1% to 30% by mass, and further preferably 2% to 20% by mass. When the content is less than 0.5% by mass, the hot offset resistance is lowered, and further it is difficult to achieve both excellent high-temperature storage resistance and excellent low-temperature fixing properties. On the other hand, when the content is more than 40% by mass, the low-temperature fixing properties tend to become poor.

The average number of the isocyanate groups contained per one molecule of prepolymer (A) having an isocyanate group is preferably 1 or more, more preferably 1.5 to 3, and further preferably 1.8 to 2.5. When the average number per one molecule is less than 1, the urea-modified polyester tends to be reduced in molecular weight, so that the hot offset resistance is lowered.

Examples of amines (B) include diamines (B1), tri- or more functional polyamines (B2), aminoalcohols (B3), aminomercaptans (B4), amino acids (B5), and B1 to B5 having an amino group blocked (B6). Examples of diamines (B1) include aromatic diamines (such as phenylenediamine, diethyltoluenediamine, and 4,4'-diaminodiphenylmethane); alicyclic diamines (such as 4,4'-diamino-3,3'-dimethyldicyclohexylmethane, diaminocyclohexane, and isophorone diamine); and aliphatic diamines (such as ethylenediamine, tetramethylenediamine, and hexamethylenediamine). Examples of tri- or more functional polyamines (B2) include diethylenetriamine and triethylenetetramine. Examples of aminoalcohols (B3) include ethanolamine and hydroxyethylaniline. Examples of aminomercaptans (B4) include aminoethylmercaptan and aminopropylmercaptan. Examples of amino acids (B5) include aminopropionic acid and aminocaproic acid. Examples of B1 to B5 having an amino group blocked (B6) include ketimine compounds obtained from the amine of B1 to B5 and a ketone (e.g., acetone, methyl ethyl ketone, or methyl isobutyl ketone), and oxazoline compounds. Among these amines (B), preferred is B1 or a mixture of B1 and a small amount of B2.

Further, if necessary, the urea-modified polyester can be controlled in molecular weight using an extension terminator. Examples of extension terminators include monoamines (such as diethylamine, dibutylamine, butylamine, and laurylamine), and compounds obtained by blocking the above monoamine (ketimine compounds).

The ratio of amine (B), i.e., the molar ratio of the isocyanate group [NCO] in prepolymer (A) having an isocyanate group to the amino group [$NH_x$] in amine (B) {[NCO]/[$NH_x$] ratio} is preferably 1/2 to 2/1, more preferably 1.5/1 to 1/1.5, and further preferably 1.2/1 to 1/1.2. When the [NCO]/[$NH_x$] ratio is more than 2 or less than 1/2, urea-modified polyester (i) has a molecular weight reduced, so that the hot offset resistance is lowered.

According to the embodiment, polyester (i) modified with a urea linkage can contain also a urethane linkage. The molar ratio of the urea linkage content to the urethane linkage content is preferably 100/0 to 10/90, more preferably 80/20 to 20/80, and further preferably 60/40 to 30/70. When the urea linkage molar ratio is less than 10%, the hot offset resistance tends to be lowered.

By the reaction described above, modified polyester, particularly urea-modified polyester (i) used in the toner can be prepared. Urea-modified polyester (i) is prepared by a one-shot method or a prepolymer method. Urea-modified polyester (i) preferably has a weight average molecular weight of 10,000 or more, more preferably 20,000 to 10,000,000, and further preferably 30,000 to 1,000,000. When the weight average molecular weight is less than 10,000, the hot offset resistance tends to be lowered.

When the below-mentioned non-modified polyester (ii) is used, with respect to the number average molecular weight of the urea-modified polyester, there is no particular limitation, and it can be a number average molecular weight such that the above weight average molecular weight can be easily obtained. When urea-modified polyester (i) is solely used, the number average molecular weight is preferably 20,000 or less, more preferably 1,000 to 10,000, and further preferably 2,000 to 8,000. When the number average molecular weight is more than 20,000, the low-temperature fixing properties and the gloss obtained when used in a full-color image forming apparatus tend to become poor.

According to the embodiemnt, not only can polyester (i) modified with a urea linkage be solely used, but also a combination of urea-modified polyester (i) and non-modified polyester (ii) can be used as a binding resin component. The use of polyesters (i) and (ii) in combination is more preferred, because both the low-temperature fixing properties and the gloss obtained when used in a full-color apparatus are improved, as compared to those obtained when using polyester (ii) solely. Examples of non-modified polyesters (ii) include polycondensation products of polyol (1) and polycarboxylic acid (2) which are similar to the polyester component of polyester (i), and preferred examples are also similar to those of polyesters (i). Non-modified polyester (ii) can be non-modified polyester or polyester with modified a chemical bond other than the urea linkage, for example, modified with a urethane linkage. From the viewpoint of obtaining excellent low-temperature fixing properties and excellent hot offset resistance, it is preferred that at least part of polyesters (i) and (ii) are compatible with each other.

Therefore, it is preferred that the polyester component of polyester (i) and polyester (ii) have a similar composition. When non-modified polyester (ii) is contained, the mass ratio of (i) to (ii) is preferably 5/95 to 80/20, more preferably 5/95 to 30/70, further preferably 5/95 to 25/75, and particularly preferably 7/93 to 20/80. When the (i) mass ratio is less than 5% by mass, the hot offset resistance tends to be lowered, and further it is difficult to achieve both excellent high-temperature storage resistance and excellent low-temperature fixing properties.

Non-modified polyester (ii) preferably has a peak molecular weight of 1,000 to 30,000, more preferably 1,500 to 10,000, and further preferably 2,000 to 8,000. When the peak molecular weight is less than 1,000, the high-temperature storage resistance tends to be lowered. On the other hand, when the peak molecular weight is more than 10,000, the low-temperature fixing properties tend to become poor. Non-modified polyester (ii) preferably has a hydroxyl value of 5 or more, more preferably 10 to 120, and further preferably 20 to 80. When the hydroxyl value is less than 5, it is difficult to achieve both excellent high-temperature storage resistance and excellent low-temperature fixing properties. Non-modified polyester (ii) preferably has an acid value of 1 to 30, and more preferably 5 to 20. The polyester having the acid value is likely to be negatively charged.

The binding resin preferably has a glass transition temperature (Tg) of 50° C. to 70° C., and more preferably 55° C. to 65° C. When the glass transition temperature is lower than 50° C., blocking tends to become poor when the toner is stored at a high temperature. On the other hand, when the glass transition temperature is higher than 70° C., the low-temperature fixing properties are unsatisfactory. By having the urea-modified polyester resin contained, the toner has a low glass transition temperature as compared to a known polyester toner, and exhibits excellent high-temperature storage resistance.

A temperature (TG') at which the binding resin has a storage elastic modulus of 1,0000 dyne/cm² as measured at a frequency of 20 hertz is preferably 100° C. or higher, and more preferably 110° C. to 200° C. When the temperature (TG') is lower than 100° C., the hot offset resistance tends to be lowered.

A temperature (Tη) at which the binding resin has a viscosity of 1,000 poises as measured at a frequency of 20 hertz is preferably 180° C. or lower, and more preferably 90° C. to 160° C. When the temperature (Tη) is higher than 180° C., the low-temperature fixing properties become poor. Specifically, from the viewpoint of achieving both excellent low-temperature fixing properties and excellent hot offset resistance, it is preferred that TG' is higher than Tη. In other words, the difference between TG' and Tη (TG'−Tη) is preferably 0° C. or more, more preferably 10° C. or more, and further preferably 20° C. or more. With respect to the upper limit of the difference, there is no particular limitation. From the viewpoint of achieving both excellent high-temperature storage resistance and excellent low-temperature fixing properties, the difference between Tη and Tg is preferably 0° C. to 100° C., more preferably 10° C. to 90° C., and further preferably 20° C. to 80° C.

The binding resin can be prepared by, for example, the following method.

Polyol (1) and polycarboxylic acid (2) are first heated to 150° C. to 280° C. in the presence of a known esterification catalyst, such as tetrabutoxytitanate or dibutyltin oxide, and, if necessary, water formed is removed under a reduced pressure to obtain polyester having a hydroxyl group. Polyisocyanate (3) is then reacted with the resultant polyester at 40° C. to 140° C. to obtain prepolymer (A) having an isocyanate group. Amine (B) is reacted with prepolymer (A) at 0° C. to 140° C. to obtain polyester modified with a urea linkage. In the reaction of polyisocyanate (3) or the reaction of prepolymer (A) and amine (B), a solvent can be used if necessary.

Examples of usable solvents include solvents inert to isocyanate (3), for example, aromatic solvents (such as toluene and xylene); ketones (such as acetone, methyl ethyl ketone, and methyl isobutyl ketone); esters (such as ethyl acetate); amides (such as dimethylformamide and dimethylacetamide), and ethers (such as tetrahydrofuran).

When polyester (ii) which is not modified with a urea linkage is used, polyester (ii) is prepared by the same method as that for the polyester having a hydroxyl group, and dissolved in and mixed into the solution obtained after the reaction of (i) above.

By way of example and without limitation, a method of preparing the toner is explained below.

The toner can be formed by either reacting a dispersion including prepolymer (A) having an isocyanate group in an aqueous medium with amine (B), or using urea-modified polyester (i) preliminarily prepared. As an example of the method for forming a stable dispersion including urea-modified polyester (i) and prepolymer (A) in an aqueous medium, there can be mentioned a method in which a composition of toner raw materials including urea-modified polyester (i) and prepolymer (A) is added to an aqueous medium and dispersed using shear force.

Prepolymer (A) and other toner compositions (hereinafter, occasionally referred to as "toner raw materials") including a colorant, a colorant master batch, a release agent, a charging controller, and a non-modified polyester resin can be mixed together when forming a dispersion in an aqueous medium. However, it is more preferred that the toner raw materials are preliminarily mixed together and then the resultant mixture is added to and dispersed in an aqueous medium. Other toner raw materials including a colorant, a release agent, and a charging controller need not be mixed when forming particles in an aqueous medium, and they can be added after the particles are formed. For example, particles containing no colorant are formed, and then a colorant can be added by a known coloring method.

As the aqueous medium, water can be used solely or water and a solvent miscible with water can be used in combination. Examples of solvents miscible with water include alcohols (such as methanol, isopropanol, and ethylene glycol), dimethylformamide, tetrahydrofuran, cellosolves (such as methylcellosolve), and lower ketones (such as acetone and methyl ethyl ketone).

The amount of the aqueous medium used is preferably 50 to 2,000 parts by mass, and more preferably 100 to 1,000 parts by mass, relative to 100 parts by mass of the toner composition including urea-modified polyester (i) and prepolymer (A). When the amount of the aqueous medium used is less than 50 parts by mass, the dispersed state of the toner compositions tends to be poor, making it difficult to obtain toner particles having a predetermined particle diameter. On the other hand, when the amount is more than 2,000 parts by mass, the use of the aqueous medium in such a large amount is not economical.

If necessary, a dispersant can be used. It is preferred to use a dispersant because the resultant particle size distribution is sharp and the dispersion is stable. With respect to the dispersing method, there is no particular limitation, and it can be appropriately selected depending on the purpose, and a known device of, for example, a low shear type, a high shear type, a friction type, a high-pressure jet type, or an ultrasonic type can be used. For obtaining a dispersion having a particle diameter of 2 micrometers to 20 micrometers, a high shear type is preferred. When a high shear-type dispersing machine is used, with respect to the number of revolutions, there is no particular limitation. However, it is preferably 1,000 revolutions per minute (rpm) to 30,000 rpm, and more preferably 5,000 rpm to 20,000 rpm. With respect to the dispersing time, there is no particular limitation; however, it is generally 0.1 minute to 5 minutes in a batch-wise mode. The temperature during the dispersion generally is preferably 0° C. to 150° C., and more preferably 40° C. to 98° C. Preferred is a high temperature, because the dispersion including urea-modified polyester (i) and prepolymer (A) has a low viscosity and hence is easily dispersed.

The synthesizing of urea-modified polyester (i) from prepolymer (A) can be conducted by either adding and reacting amine (B) before dispersing the toner compositions in an aqueous medium or dispersing the toner compositions in an aqueous medium and then adding amine (B) to effect a reaction at particle interfaces. In this case, urea-modified polyester is preferentially formed on the surface of the toner produced, thus forming a concentration slope in the particles.

In the reaction, it is preferred that a dispersant is used if necessary. With respect to the dispersant, there is no particular limitation, and it can be appropriately selected depending on the purpose, and examples include surfactants, water-insoluble inorganic compound dispersants, and polymer protective colloids. These can be used individually or in combination. Among these, preferred is a surfactant.

Examples of the surfactants include anionic surfactants, cationic surfactants, nonionic surfactants, and amphoteric surfactants.

Examples of the anionic surfactants include alkylbenzenesulfonates, α-olefinsulfonates, and phosphates, and, of these, preferred examples include anionic surfactants having a fluoroalkyl group. Examples of the anionic surfactants having a fluoroalkyl group include fluoroalkylcarboxylic acids having 2 to 10 carbon atoms and metal salts thereof, disodium perfluorooctanesulfonylglutamate, sodium 3-[omega-fluoroalkyl (having 6 to 11 carbon atoms) oxy]-1-alkyl (having 3 to 4 carbon atoms) sulfonate, sodium 3-[omega-fluoroalkanoyl (having 6 to 8 carbon atoms)-N-ethylamino]-1-propanesulfonate, fluoroalkyl (having 11 to 20 carbon atoms) carboxylic acids and metal salts thereof, perfluoroalkylcarboxylic acids (having 7 to 13 carbon atoms) and metal salts thereof, perfluoroalkyl (having 4 to 12 carbon atoms) sulfonic acids and metal salts thereof, perfluorooctanesulfonic acid diethanolamide, N-propyl-N-(2-hydroxyethyl)perfluorooctanesulfonamide, perfluoroalkyl (having 6 to 10 carbon atoms) sulfonamide propyltrimethylammonium salts, perfluoroalkyl (having 6 to 10 carbon atoms)-N-ethylsulfonylglycine salts, and monoperfluoroalkyl (having 6 to 16 carbon atoms) ethyl phosphates. Examples of commercially available surfactants having a fluoroalkyl group include Surflon S-111, S-112, S-113 (manufactured by Asahi Glass Co., Ltd.); Fluorad FC-93, FC-95, FC-98, FC-129 (manufactured by Sumitomo 3M); Unidyne DS-101, DS-102 (manufactured by Daikin industries, Ltd.); Megafack F-110, F-120, F-113, F-191, F-812, F-833 (manufactured by Dainippon Ink & Chemicals Incorporated); Ectop EF-102, 103, 104, 105, 112, 123A, 123B, 306A, 501, 201, 204 (manufactured by Tohchem Products Co., Ltd.); and Ftergent F-100, F150 (manufactured by Neos Company Limited).

Examples of the cationic surfactants include amine salt-type surfactants and quaternary ammonium salt-type cationic surfactants. Examples of the amine salt-type surfactants include alkylamine salts, aminoalcohol fatty acid derivatives, polyamine fatty acid derivatives, and imidazoline. Examples of the quaternary ammonium salt-type cationic surfactants include alkyltrimethylammonium salts, dialkyldimethylammonium salts, alkyldimethylbenzylammonium salts, pyridinium salts, alkylisoquinolinium salts, and benzethonium chloride. Among the cationic surfactants, preferred examples include aliphatic primary, secondary, or tertiary amine acids having a fluoroalkyl group, aliphatic quaternary ammonium salts, such as perfluoroalkyl (having 6 to 10 carbon atoms) sulfonamide propyltrimethylammonium salts, benzalkonium salts, benzethonium chloride, pyridinium salts, and imidazolinium salts. Examples of commercially available cationic surfactants include Surflon S-121 (manufactured by Asahi Glass Co., Ltd.); Fluorad FC-135 (manufactured by Sumitomo 3M); Unidyne DS-202 (manufactured by Daikin industries, Ltd.); Megafack F-150, F-824 (manufactured by Dainippon Ink & Chemicals Incorporated); Ectop EF-132 (manufactured by Tohchem Products Co., Ltd.); and Ftergent F-300 (manufactured by Neos Company Limited).

Examples of the nonionic surfactants include fatty acid amide derivatives and polyhydric alcohol derivatives.

Examples of the amphoteric surfactants include alanine, dodecyldi(aminoethyl)glycine, di(octylaminoethyl)glycine, and N-alkyl-N,N-dimethylammonium betaine.

Examples of the water-insoluble inorganic compound dispersants include calcium triphosphate, calcium carbonate, titanium oxide, colloidal silica, and hydroxyapatite.

Examples of the polymer protective colloids include acids, (meth)acrylic monomers containing a hydroxyl group, vinyl alcohol or ethers of vinyl alcohol, esters of vinyl alcohol and a compound containing a carboxyl group, amide compounds or methylol compounds thereof, chlorides, homopolymers or copolymers of a compound having a nitrogen atom or a heterocycle thereof, polyoxyethylenes, and celluloses.

Examples of the acids include acrylic acid, methacrylic acid, α-cyanoacrylic acid, α-cyanomethacrylic acid, itaconic acid, crotonic acid, fumaric acid, maleic acid, and maleic anhydride. Examples of the (meth)acrylic monomers containing a hydroxyl group include β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylate, diethylene glycol monomethacrylate, glycerol monoacrylate, glycerol monomethacrylate, N-methylolacrylamide, and N-methylolmethacrylamide. Examples of the vinyl alcohol or ethers of vinyl alcohol include vinyl methyl ether, vinyl ethyl ether, and vinyl propyl ether. Examples of the esters of vinyl alcohol and a compound containing a carboxyl group include vinyl acetate, vinyl propionate, and vinyl butyrate. Examples of the amide compounds or methylol compounds thereof include acrylamide, methacrylamide, diacetone acrylamide acid, and methylol compounds thereof. Examples of the chlorides include acrylic acid chloride and methacrylic acid chloride. Examples of the homopolymers or copolymers of a compound having a nitrogen atom or a heterocycle thereof include vinylpyridine, vinylpyrrolidone, vinylimidazole, and ethyleneimine. Examples of the polyoxyethylenes include polyoxyethylene, polyoxypropylene, polyoxyethylene alkylamines, polyoxypropylene alkylamines, polyoxyethylene alkylamides, polyoxypropylene alkylamides, polyoxyethylene nonyl phenyl ether, polyoxyethylene lauryl phenyl ether, polyoxyethylene stearyl phenyl ester, and polyoxyethylene nonyl phenyl ester. Examples of the celluloses include methyl cellulose, hydroxyethyl cellulose, and hydroxypropyl cellulose.

In the preparation of the dispersion, if necessary, a dispersion stabilizer can be used. Examples of the dispersion stabilizers include those soluble in an acid or alkali, such as calcium phosphate.

When the dispersion stabilizer is used, calcium phosphate can be removed from the particles by, for example, a method in which calcium phosphate is dissolved by an acid, such as hydrochloric acid, and then washed with water or a method in which it is decomposed by an enzyme.

In the preparation of the dispersion, a catalyst for the extension reaction or crosslinking reaction can be used. Examples of the catalysts include dibutyltin laurate and dioctyltin laurate.

For lowering the viscosity of the toner composition, there can be used a solvent in which urea-modified polyester (i) or prepolymer (A) is soluble. It is preferred to use the solvent, because the resultant particle size distribution is sharp. The solvent is preferably volatile from the viewpoint of facilitating the removal of solvent.

Examples of the solvents include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. These can be used individually or in combination. Among these, preferred is an aromatic solvent, such as toluene or xylene; or a halogenated hydrocarbon, such as methylene chloride, 1,2-dichloroethane, chloroform, or carbon tetrachloride, and more preferred is an aromatic solvent, such as toluene or xylene.

The amount of the solvent used is preferably 0 to 300 parts by mass, more preferably 0 to 100 parts by mass, and further preferably 25 to 70 parts by mass, relative to 100 parts by mass of prepolymer (A). When a solvent is used, the solvent is removed by heating under atmospheric pressure or a reduced pressure after the extension and/or crosslinking reaction.

The extension and/or crosslinking reaction time is appropriately selected depending on the reactivity determined by the combination of the structure of the isocyanate group in prepolymer (A) and amine (B). Generally, the reaction time is preferably 10 minutes to 40 hours, and more preferably 2 hours to 24 hours, and the reaction temperature is preferably 0° C. to 150° C., more preferably 40° C. to 98° C. If necessary, a known catalyst can be further used. Specific examples include dibutyltin laurate and dioctyltin laurate.

For removing the organic solvent from the emulsified dispersion obtained, there can be employed a method in which the whole of the system is gradually heated so that the organic solvent in liquid drops is completely removed by evaporation. Alternatively, there can be employed a method in which the emulsified dispersion is sprayed into a dried atmosphere so that the water-insoluble organic solvent in liquid drops is completely removed simultaneously with removal of the aqueous dispersant by evaporation, forming toner particles. As the dried atmosphere into which the emulsified dispersion is sprayed, heated gas of air, nitrogen, carbonic acid gas, or combustion gas, particularly an air flow heated to a temperature equal to or higher than the boiling point of the highest boiling-point solvent used is generally used. Desired quality is obtained by a short-time treatment using a spray dryer, a belt dryer, or a rotary kiln.

When the particles being emulsified and dispersed have particle size distribution broader than desired and the particles washed and dried keeps that particle size distribution, the particle size distribution can be adjusted by classification into desired particle size distribution.

In the classification operation, a fine particle portion can be removed in a liquid by, for example, a cyclone, a decanter, or a centrifugal separator. Dried powder can be subjected to classification; however, the classification is preferably in a liquid from the viewpoint of achieving high efficiency. The unnecessary fine particles or coarse particles can be used again in the formation of particles by recycling and kneading. At this time, the unnecessary fine particles or coarse particles can be in a wet state.

The dispersant used is advantageously removed from the resultant dispersion; however, the removal of the dispersant is preferably conducted simultaneously with the classification operation described above.

The resultant dried toner powder is mixed with foreign particles, such as release agent particles, charging controlling particles, fluidizer particles, or colorant particles, and mechanical impact force is applied to the mixed powder to immobilize or fuse the particles on the surface, so that the foreign particles are prevented from leaving the surface of the resultant composite particles.

Specific examples of methods include (1) a method in which impact force is applied to the mixture by a blade rotating at a high speed and (2) a method in which the mixture is placed in a high-speed air flow and accelerated so that the particles or composite particles collide with an appropriate collision plate. Examples of machines include Ong mill (manufactured by Hosokawa Micron Corporation), a machine obtained by modifying I-type mill (manufactured by Nippon Pneumatic Mfg. Co., Ltd.) so that the grinding air pressure is reduced, a hybridization system (manufactured by Nara Machinery Co., Ltd.), a Kryptron system (manufactured by Kawasaki Heavy Industries, Ltd.), and an automatic mortar.

As a colorant used in the toner, a pigment or dye conventionally used as a colorant for toner can be used, and, specifically, carbon black, lamp black, iron black, ultramarine blue, nigrosine dyes, aniline blue, phthalocyanine blue, phthalocyanine green, Hansa yellow G, rhodamine 6C lake, chalcone oil blue, chrome yellow, quinacridone red, benzidine yellow, or rose bengal can be used individually or in combination.

Further, if necessary, for imparting magnetic properties to the toner particles, a magnetic component, for example, iron oxide, such as ferrite, magnetite, or maghemite, a metal, such as iron, cobalt, or nickel, or an alloy thereof with another metal can be added solely or in the form of a mixture to the toner particles. The above component can be used as a colorant component.

The colorant contained in the toner preferably has a number average particle diameter of 0.5 micrometer or less, more preferably 0.4 micrometer or less, and further preferably 0.3 micrometer or less. When the number average particle diameter is more than 0.5 micrometer, satisfactory dispersibility of the pigment cannot be obtained, making it difficult to achieve desired transparency. On the other hand, the fine particle-diameter colorant having a number average particle diameter of less than 0.1 micrometer is even smaller than the half wavelength of visible light, and hence it is considered that such a colorant does not adversely affect the light reflection or absorption properties. Therefore, the colorant particles having a number average particle diameter of less than 0.1 micrometer contribute to excellent color reproducibility and excellent transparency of an over-head projector (OHP) sheet having a fixed image. When a colorant having a number average particle diameter of more than 0.5 micrometer is present in a large amount, it is likely that the incident light is prevented from transmitting the sheet or is scattered, leading to a lowering of the brightness or clearness of a projected image of the OHP sheet. Further, when a colorant having a particle diameter of more than 0.5 micrometer is present in a large amount, the colorant is likely to leave the surface of the toner particles, causing various problems of fogging, drum contamination, and cleaning failure. The colorant having a number average particle diameter of more than 0.7 micrometer is preferably in an amount of 10% by number or less, and more preferably 5% by number or less, based on the total number of the colorant particles.

When the colorant, part of or all of the binding resin, and a wetting agent preliminarily added are kneaded together, the binding resin and the colorant satisfactorily adhere to each other initially, and hence the colorant is more efficiently dispersed in the toner particles in the subsequent toner production, so that the dispersed particle diameter of the colorant is reduced, thus obtaining further excellent transparency.

As the binding resin used in the preliminary kneading, a resin shown above as examples of the binding resins for toner can be directly used. However, the resin is not limited to these.

As a specific example of the method for preliminarily kneading a mixture of the binding resin and colorant together with a wetting agent, there can be mentioned a method in which the binding resin, colorant, and wetting agent are mixed by a blender, such as a Henschel mixer, and then the resultant mixture is kneaded by, for example, a two-roll or three-roll kneader at a temperature lower than the melt temperature of the binding resin to obtain a sample.

As a wetting agent, a general wetting agent can be used taking into consideration the solubility of the binding resin and the wettability of the colorant. However, from the viewpoint of achieving excellent dispersibility of the colorant, preferred is an organic solvent, such as acetone, toluene, or butanone, or water. Among these, the use of water is particularly preferred from the viewpoint of protecting the environment and maintaining the dispersion stability of the colorant in the subsequent toner production.

In this method, not only the colorant particles contained in the resultant toner have a reduced particle diameter, but also the dispersed state of the particles is highly uniform, thus further improving the color reproducibility of the projected image of OHP.

It is preferred that the toner contains a release agent together with the binding resin and colorant. With respect to the release agent, there is no particular limitation, and it can be appropriately selected depending on the purpose from those conventionally known, and examples include polyolefin wax (such as polyethylene wax and polypropylene wax); long-chain hydrocarbons (such as paraffin wax and sasol wax); and carbonyl group-containing wax. Among these, particularly preferred is carbonyl group-containing wax.

Examples of the carbonyl group-containing wax include polyalkanoates (such as carnauba wax, montan wax, trimethylolpropane tribehenate, pentaerythritol tetrabehenate, pentaerythritol diacetate dibehenate, glycerol tribehenate, and 1,18-octadecanediol distearate); polyalkanol esters (such as tristearyl trimellitate and distearyl maleate); polyalkanoic acid amides (such as ethylenediamine dibehenylamide); polyalkylamides (such as trimellitic acid tristearylamide); and dialkyl ketones (such as distearyl ketone). Among these, particularly preferred is a polyalkanoate.

The release agent preferably has a melting point of 40° C. to 160° C., more preferably 50° C. to 120° C., and further preferably 60° C. to 90° C. When the melting point is lower than 40° C., the high-temperature storage resistance tends to be lowered. On the other hand, when the melting point is higher than 160° C., cold offset is likely to occur during the fixing at a low temperature.

The release agent preferably has a melt viscosity of 5 centipoises (cps) to 1,000 cps, and more preferably 10 cps to 100 cps at a temperature higher than the melting point by 20° C. When the melt viscosity is more than 1,000 cps, the improvement of hot offset resistance or low-temperature fixing properties tends to be unsatisfactory.

The content of the release agent in the toner is preferably 0% to 40% by mass, and more preferably 3% to 30% by mass.

For increasing the toner charged amount and facilitating the charging of the toner, a charging controller can be added to the toner if necessary. When the charging controller includes a colored material, color can be changed. Therefore, it is preferred that the charging controller includes a colorless or nearly white material.

With respect to the charging controller, there is no particular limitation, and it can be appropriately selected depending on the purpose from those conventionally known. Examples include triphenylmethane dyes, molybdic acid chelate pigments, Rhodamine dyes, alkoxyamines, quaternary ammonium salts (including fluorine-modified quaternary ammonium salts), alkylamides, phosphorus simple substance or compounds thereof, tungsten simple substance or compounds thereof, fluorine-based activating agents, metal salts of salicylic acid, and metal salts of a salicylic acid derivative.

Commercially available charging controllers can be used, and examples of the commercially available charging controllers include quaternary ammonium salt Bontron P-51, oxynaphthoic acid metal complex E-82, salicylic acid metal complex E-84, and phenolic condensation product E-89 (each manufactured by Orient Chemical Co., Ltd.); quaternary ammonium salt molybdenum complex TP-302, TP-415 (each manufactured by Hodogaya Chemical Co., Ltd.); quaternary ammonium salt CopyCharge PSY VP2038, triphenylmethane derivative CopyBlue PR, quaternary ammonium salt CopyCharge NEG VP2036, and CopyCharge NX VP434 (each manufactured by Hoechst); LRA-901, and boron complex LR-147 (each manufactured by Japan Carlit Co., Ltd.), quinacridone, azo pigments, and polymer compounds having a functional group, such as a sulfonic acid group, a carboxyl group, or a quaternary ammonium salt.

The amount of the charging controller added can be appropriately selected depending on the type of the binder resin, the use of an additive, or the toner production method including the dispersing method. The amount is preferably 0.1 to 10 parts by mass, and more preferably 0.2 to 5 parts by mass, relative to 100 parts by mass of the binder resin. When the amount of the charging controller added is more than 10 parts by mass, the charging properties for the toner are too marked and the effect of the charging controller is reduced, and the electrostatic attraction force between the toner and a development roller is increased, leading to a lowering of the fluidity of the developer or lowering of the image concentration. The charging controller can be melt-kneaded with a master batch and a resin and then dissolved and dispersed; can be directly dissolved in an organic solvent and added upon dispersing; or can be immobilized on the surface of the toner after the toner particles are prepared.

Resin particles can be added mainly for stabilizing the dispersion upon dispersing the toner compositions in an aqueous medium in the toner production process.

In the resin particles, any resin can be used as long as it is a resin capable of forming an aqueous dispersion, and the resin can be either a thermoplastic resin or a thermosetting resin, and examples include vinyl resins, polyurethane resins, epoxy resins, polyester resins, polyamide resins, polyimide resins, silicon resins, phenolic resins, melamine resins, urea resins, aniline resins, ionomer resins, and polycarbonate resins. These can be used individually or in combination. Among these, from the viewpoint of easily obtaining an aqueous dispersion of resin fine spherical particles, preferred is a vinyl resin, a polyurethane resin, an epoxy resin, a polyester resin, or a combination thereof.

As the vinyl resin, a polymer obtained by homopolymerizing or copolymerizing vinyl monomers is used, and examples include styrene-(meth)acrylate resins, styrene-butadiene copolymers, (meth)acrylic acid-acrylate polymers, styrene-acrylonitrile copolymers, styrene-maleic anhydride copolymers, and styrene-(meth)acrylic acid copolymers.

As an additive for improving the fluidity, developing properties, and charging properties of the toner particles, inorganic particles are preferred.

Examples of the inorganic particles include silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride.

The inorganic particles preferably have a primary particle diameter of 5 nanometers to 2 micrometers, and more preferably 5 nanometers to 500 nanometers. The inorganic particles preferably have a specific surface area of 20 $m^2$/g to 500 $m^2$/g, as measured by a BET method. The amount of the inorganic particles added to the toner is preferably 0.01% to 5% by mass, and more preferably 0.01% to 2.0% by mass.

Examples of other polymer particles include particles of polystyrene, methacrylate, or acrylate copolymer obtained by, for example, soap-free emulsion polymerization, suspension polymerization, or dispersion polymerization, particles of a polycondensation polymer, such as silicone, benzoguanamine, or nylon, and polymer particles made of a thermosetting resin.

A fluidizer can be added to the toner. The fluidizer makes a surface treatment to improve the hydrophobicity, making it possible to prevent a lowering of the fluidity properties or charging properties even at a high humidity. Examples of the fluidizers include silane coupling agents, silylating agents, silane coupling agents having a fluoroalkyl group, organic titanate coupling agents, aluminum coupling agents, silicone oil, and modified silicone oil.

Examples of cleaning improving agents for removing the developer remaining on the photoconductor 1 or intermediate transfer member 60 after the transfer include metal salts of a fatty acid, such as stearic acid, for example, zinc stearate and calcium stearate; and polymer particles prepared by, for example, soap-free emulsion polymerization, such as polymethyl methacrylate particles and polystyrene particles. It is preferred that the polymer particles have relatively narrow particle size distribution and have a volume average particle diameter of 0.01 micrometer to 1 micrometer. By using the above toner, a high-quality toner image with excellent development stability as mentioned above can be formed.

The image forming apparatus 100 can use not only the polymerized toner described above, which is advantageously used for obtaining a high-quality image, but also toner having an indefinite form produced by grinding (grinded toner), and, also in the latter case, the life of the image forming apparatus 100 can be extended. With respect to the material constituting the grinded toner, there is no particular limitation, and a material generally used in electrophotographic toner can be used.

Examples of the binding resins used in the grinded toner include homopolymers of styrene or a substitution product thereof, such as polystyrene, poly-p-chlorostyrene, and polyvinyl toluene; styrene copolymers, such as styrene/p-chlorostyrene copolymers, styrene/propylene copolymers, styrene/vinyltoluene copolymers, styrene/vinylnaphthalene copolymers, styrene/methyl acrylate copolymers, styrene/ethyl acrylate copolymers, styrene/butyl acrylate copolymers, styrene/octyl acrylate copolymers, styrene/methyl methacrylate copolymers, styrene/ethyl methacrylate copolymers, styrene/butyl methacrylate copolymers, styrene/methyl α-chloromethacrylate copolymers, styrene/acrylonitrile copolymers, styrene/vinyl methyl ketone copolymers, styrene/butadiene copolymers, styrene/isoprene copolymers, and styrene/maleic acid copolymers; acrylate homopolymers or copolymers, such as polymethyl acrylate, polybutyl acrylate, polymethyl methacrylate, and polybutyl methacrylate; polyvinyl derivatives, such as polyvinyl chloride and polyvinyl acetate; polyester polymers, polyurethane polymers, polyamide polymers, polyimide polymers, polyol polymers, epoxy polymers, terpene polymers, aliphatic or alicyclic hydrocarbon resins, and aromatic petroleum resins. These can be used individually or in combination. Among these, preferred is a styrene-acrylic copolymer resin, a polyester resin, or a polyol resin from the viewpoint of achieving excellent electrical properties and reducing the cost, and particularly preferred is a polyester resin or polyol resin having excellent fixing properties.

The grinded toner can be prepared by, if necessary, premixing the resin component and the colorant component, wax component, charge controlling component, and others, and kneading the mixture at a temperature near or lower than the melt temperature of the resin component and cooling the resultant mixture, and then subjecting it to grinding and classification, and, if necessary, adding the additive component.

The developing machine can be of either a dry development system or a wet development system, and can be either a monocolor developing machine or a multicolor developing machine, and preferred examples include a developing machine including a stirrer that charges the toner or developer by frictional stirring, and a rotatable magnetic roller.

In the developing machine, for example, the toner and the carrier are mixed together and stirred. At this time, the toner is charged due to the friction, and kept in a spike form on the surface of the rotating magnetic roller to form a magnetic brush. The magnetic roller is placed near the photoconductor 1, and hence part of the toner constituting the magnetic brush formed on the surface of the magnetic roller moves toward the surface of the photoconductor 1 due to the electrical attraction force, so that the electrostatic latent image is developed with the toner to form a visible toner image on the surface of the photoconductor 1.

The developer contained in the developing machine is a developer including the toner, and the developer can be either a single-component developer or a two-component developer.

The transfer device 6 transfers a visible image onto a recording medium. Preferably, a visible image is primary-transferred onto the intermediate transfer member 60 and then is secondary-transferred onto the recording medium. More preferably, a visible image formed with toner of two colors or more (e.g., a full-color image) is primary-transferred onto the intermediate transfer member 60, and then is secondary-transferred onto a recording medium.

The transfer device 6 transfers an image by, for example, charging a visible image on the photoconductor 1 using a transfer static charger. The transfer device 6 preferably includes a primary transfer unit that transfers the visible image onto the intermediate transfer member 60 to form a composite transferred image, and a secondary transfer unit that transfers the composite transferred image onto a recording medium.

With respect to the intermediate transfer member 60, there is no particular limitation, and it can be appropriately selected depending on the purpose from the transfer bodies conventionally known, and preferred examples include a transfer belt.

The photoconductor 1 can serve as an intermediate transfer member which is used in forming an image in a so-called intermediate transfer system such that the toner image formed on the photoconductor is primary-transferred and colors are stacked, and the image is further transferred onto a recording medium.

It is preferred that the intermediate transfer member 60 exhibits electrical conduction such that it has a volume resistance of $1.0 \times 10^5$ Ω·cm to $1.0 \times 10^{11}$ Ω·cm. When the volume resistance is less than $1.0 \times 10^5$ Ω·cm, a damage of the toner image due to the discharge caused when the toner image is transferred from the photoconductor 1 onto the intermediate transfer member 60, i.e., so-called transfer dust is likely to be caused. On the other hand, when the volume resistance is more than $1.0 \times 10^{11}$ Ω·cm, after the toner image is transferred from the intermediate transfer member 60 to a recording medium, such as paper, charges opposite the toner image are likely to remain on the intermediate transfer member 60 to form a residual image on the next image.

As the intermediate transfer member 60 can be used, for example, a belt-form or cylindrical plastic obtained by kneading conductive particles of a metal oxide, such as tin oxide or indium oxide, or carbon black, a conductive polymer, or a mixture thereof and a thermoplastic resin, and then extruding the resultant mixture. Alternatively, a resin liquid including heat-crosslinking monomers or oligomers and the conductive particles or conductive polymer, as necessary, are subjected to centrifugal molding while heating to form an intermediate transfer layer on an endless belt.

When a surface layer is formed on the intermediate transfer member 60, there can be used a composition including the surface layer materials used in the photoconductor surface layer, excluding the charge transport material, to which an appropriate conductive substance is added to control the resistance.

It is preferred that the transfer device 6 (the primary transfer unit and the secondary transfer unit) includes a device that causes the visible image formed on the photoconductor 1 to be removed and charged on the recording medium. The device can be formed of either single unit or two or more units. Examples of the device include a corona transfer device using corona discharge, a transfer belt, a transfer roller, a pressure transfer roller, and an adhesive transfer device.

With respect to the recording medium, there is no particular limitation, and it can be appropriately selected from the recording media (recording paper) conventionally known.

The protective-layer forming device 2 applies the protective agent 21 to the surface of the photoconductor 1 after the transfer to form a protective layer.

The fixing unit fixes the visible image transferred onto the recording medium. The fixing operation can be conducted each time a toner image of each color is transferred onto a recording medium or at once after toner images of respective colors are superimposed.

With respect to the fixing unit, there is no particular limitation, and it can be appropriately selected depending on the purpose, and preferred is a known heat-pressing unit. Examples of the heat-pressing units include a combination of a heating roller and a press roller, and a combination of a heating roller, a press roller, and an endless belt. It is preferred that heating by the heat-pressing unit is generally at 80° C. to 200° C. According to the purpose, for example, a known optical fixing device can be used in addition to or instead of the fixing unit.

The destaticizing unit destaticizes the photoconductor 1 by applying thereto a destaticizing bias, and can be performed by a destaticizing unit. With respect to the destaticizing unit, there is no particular limitation as long as it can apply a destaticizing bias to the photoconductor 1, and it can be appropriately selected from the static eliminators conventionally known, and preferred examples include a destaticizing lamp.

The cleaning mechanism 4 removes the electrophotographic toner remaining on the photoconductor 1. It is preferred that the cleaning mechanism 4 is formed downstream of the transfer device 6 and upstream of the protective-layer forming device 2. With respect to the cleaning mechanism 4, there is no particular limitation as long as it can remove the electrophotographic toner remaining on the photoconductor 1, and it can be appropriately selected from the cleaners conventionally known, and preferred examples include a magnetic brush cleaner, an electrostatic brush cleaner, a magnetic roller cleaner, a blade cleaner, a brush cleaner, and a web cleaner.

The recycling unit recycles the toner removed by the cleaning mechanism 4. With respect to the recycling unit, there is no particular limitation, and examples include moving units conventionally known.

The controlling unit controls the operation mentioned above. With respect to the control unit, there is no particular limitation as long as it can control the operations of the above units, and it can be appropriately selected depending on the purpose, and examples include electric devices, such as a sequencer and a personal computer.

Developing Device 5

Figure 3:
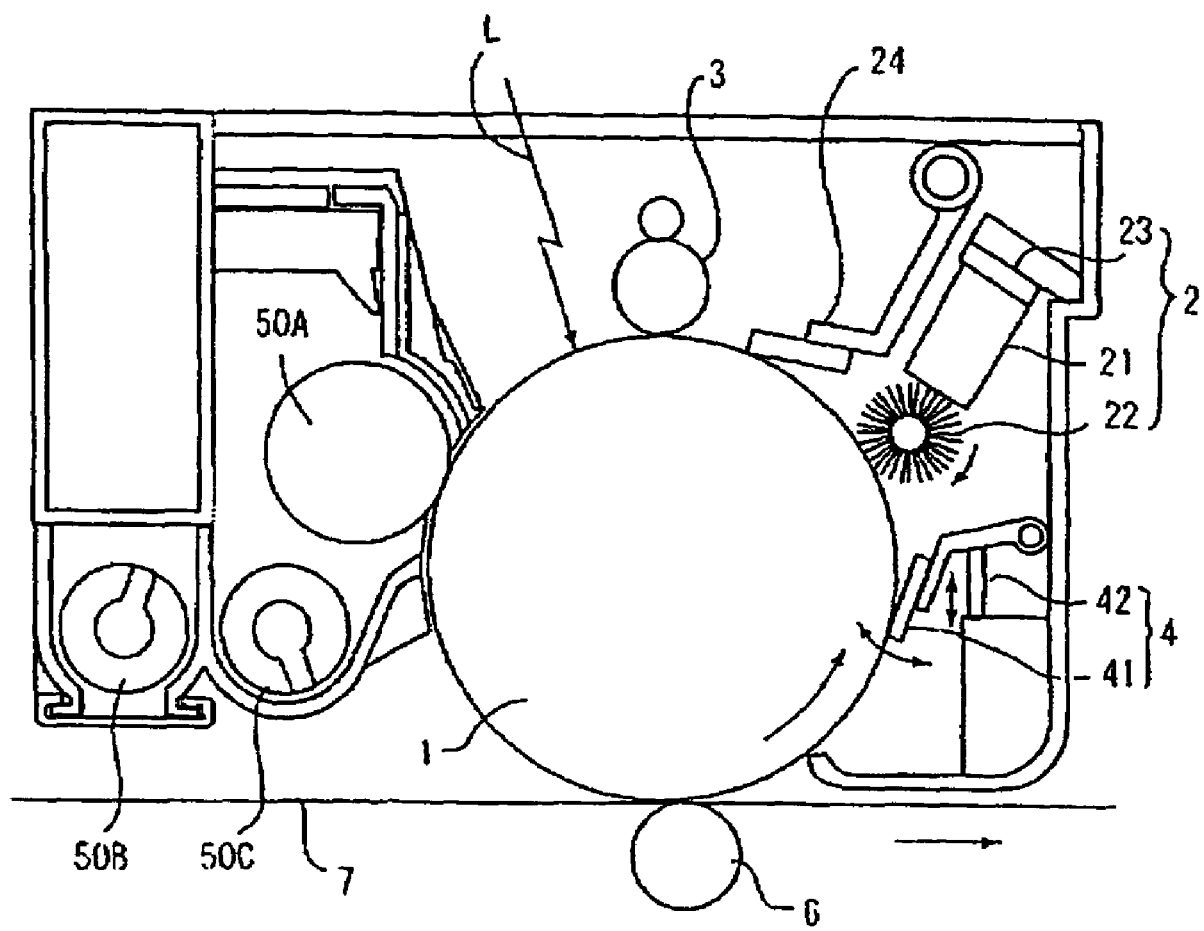
FIG. 3 is a schematic diagram of a process cartridge according to an embodiment of the present invention.

FIG. 3 is a schematic diagram of a process cartridge according to an embodiment of the present invention.

The process cartridge includes the photoconductor 1, the protective-layer forming device 2, the static charger 3, the cleaning mechanism 4, the developing device 5, the transfer device 6, a development sleeve 50A, and stirring and moving members 50B and 50C. The process cartridge can include an exposure unit, and a destaticizing unit as necessary.

The process cartridge is detachable from a variety of electrophotographic apparatuses, and it is preferred that the process cartridge is detachably set in the image forming apparatus 100.

In the process cartridge, the protective-layer forming device 2, positioned to face the photoconductor 1, includes the protective agent 21, the protective-agent feeding member 22, the pressure applying member 23, and the protective-layer forming member 24.

The photoconductor 1 has the protective agent, which has partially deteriorated after the transferring operation, and residual toner remains on its surface. The cleaning member 41 removes the residual toner from the surface of the photoconductor 1.

In FIG. 3, the cleaning member 41 is in contact with the surface of the photoconductor 1 at an angle belonging to the angle of a so-called counter type (leading type).

Onto the surface of the photoconductor 1, from which the remaining toner and the protective agent which has deteriorated are removed by the cleaning mechanism, is fed the protective agent 21 from the protective-agent feeding member 22 to form a protective layer in a film form by the protective-layer forming member 24. At this time, the protective agent has excellent adsorptivity onto a portion of the surface of the photoconductor 1, which is increased in hydrophilicity due to electrical stresses. Thus, even when a large amount of electrical stresses are temporarily applied to the surface of the photoconductor 1 and the surface partially begins to deteriorate, the adsorption of the protective agent onto the surface prevents the deterioration of the photoconductor 1 from further proceeding.

The photoconductor 1 having the thus formed protective layer is charged and then irradiated with exposure light L, such as a laser beam, to form an electrostatic latent image, and the latent image is developed by the developing device 5 to form a visible image, and the visible image is transferred onto a recording medium 7 by, for example, a transfer roller located outside the process cartridge.

As mentioned above, the process cartridge is acceptable to the change of the surface state of the photoconductor 1, particularly to the presence of a low resistance portion on the surface. Besides, the process cartridge has a construction such that the fluctuations in charging performance for the photoconductor 1 are suppressed, and therefore, with the use of the process cartridge and the toner having the construction mentioned above in combination, a high-quality image can be stably formed for a long term.

EXAMPLES

Example 1

Preparation of Protective Agent 1

A composition having the protective agent recipe 1 shown in Table 1 was placed in a lidded container made of glass, and melted and dispersed by stirring by a hot stirrer having a temperature controlled to be 110° C.

The melted composition having protective agent recipe 1 was put in a mold made of aluminum having an inner size of 12 mm×8 mm×350 mm preheated to 85° C. so that the mold was filled with the composition, and cooled to 40° C. by allowing it to stand in an atmosphere at room temperature, and then heated again to 45° C. by a temperature-controlled thermostatic chamber and that temperature was maintained for 15 minutes, followed by cooling to room temperature.

After the cooling, the resultant solid article having the protective agent recipe 1 was removed from the mold, and cut into a size of 7 mm×8 mm×310 mm, and bonded to a support made of a metal by a double-sided adhesive tape to prepare a protective agent 1.

Examples 2 to 26 and Comparative Examples 1 to 5

Preparation of Protective Agents 2 to 26

Protective agents 2 to 26 were individually prepared in substantially the same manner as in Example 1 except that the raw materials for protective agent, melt temperature, mold preheat temperature, and cooling conditions shown in Tables 1 and 2 were respectively employed.

With respect to each of the protective agents obtained, an endothermic peak temperature was measured as follows. The results are shown in Tables 2 and 4.

(Measurement of Endothermic Peak Temperature)

An endothermic peak of each protective agent was measured using a differential thermal analyzer (DSC-60; manufactured by Shimadzu Corporation).

As a sample, about 10 milligrams of each protective agent was cut, and accurately weighed and placed in a lidded aluminum container (sample pan). An endothermic peak temperature was measured by employing a differential thermal profile in the temperature elevation, and used as a measurement value.

TABLE 1

| | | Hydrophilic organic compound | | | Amphiphilic organic compound | | | Other components | |
|---|---|---|---|---|---|---|---|---|---|
| | | Name | Saccharibe number | Mw | Formulation amount | Name | HLB | Formulation amount | Name | Formulation amount |
| Example 1 | Protective agent 1 | D-Glucose dehydration-condensation product | 90 | — | 10 | Glyceryl monostearate | 3.5 | 90 | — | 0 |
| Example 2 | Protective agent 2 | D-Glucose dehydration-condensation product | 90 | — | 15 | Sorbitan tristearate | 1.5 | 85 | — | 0 |
| Example 3 | Protective agent 3 | Polyethylene glycol | — | 1500 | 10 | Glyceryl monostearate | 3.5 | 90 | — | 0 |
| Example 4 | Protective agent 4 | Polyethylene glycol | — | 1500 | 15 | Sorbitan tristearate | 1.5 | 85 | — | 0 |
| Example 5 | Protective agent 5 | D-Glucose dehydration-condensation product | 90 | — | 20 | Glyceryl monostearate | 3.5 | 80 | — | 0 |
| Example 6 | Protective agent 6 | D-Glucose dehydration-condensation product | 90 | — | 1 | Glyceryl monostearate | 3.5 | 99 | — | 0 |
| Example 7 | Protective agent 7 | D-Glucose dehydration-condensation product | 90 | — | 5 | Sorbitan monobehenate | 4.8 | 95 | — | 0 |
| Example 8 | Protective agent 8 | D-Glucose dehydration-condensation product | 90 | — | 10 | Glyceryl monomontanate | 1.1 | 90 | — | 0 |
| Example 9 | Protective agent 9 | D-Glucose dehydration-condensation product | 90 | — | 10 | Glyceryl monostearate | 5.9 | 90 | — | 0 |
| Example 10 | Protective agent 10 | D-Glucose dehydration-condensation product | 90 | — | 10 | Glyceryl monomelissate | 0.8 | 90 | — | 0 |
| Example 11 | Protective agent 11 | D-Glucose dehydration condensation product | 90 | — | 10 | Glyceryl monoisostearate | 3.5 | 90 | — | 0 |
| Example 12 | Protective agent 12 | D-Glucose dehydration-condensation product | 90 | — | 10 | Sorbitan dipalmitate | 3.6 | 90 | — | 0 |
| Example 13 | Protective agent 13 | D-Glucose dehydration-condensation product | 90 | — | 10 | Sorbitan monomelissate | 3.2 | 90 | — | 0 |
| Example 14 | Protective agent 14 | D-Glucose dehydration-condensation product | 90 | — | 10 | Sorbitan dipentadecanoate | 4.0 | 90 | — | 0 |

TABLE 1-continued

| | | Hydrophilic organic compound | | | | Amphiphilic organic compound | | | Other components | |
|---|---|---|---|---|---|---|---|---|---|---|
| | | Name | Saccharibe number | Mw | Formulation amount | Name | HLB | Formulation amount | Name | Formulation amount |
| Example 15 | Protective agent 15 | D-Glucose dehydration-condensation product | 90 | — | 10 | Glyceryl monotetracontanoate | 1.7 | 90 | — | 0 |
| Example 16 | Protective agent 16 | D-Glucose dehydration-condensation product | 90 | — | 20 | Zinc stearate | 1.2 | 90 | — | 0 |
| Example 17 | Protective agent | D-Glucose dehydration-condensation product | 10 | — | 10 | Glyceryl monostearate | 3.5 | 90 | — | 0 |
| Example 18 | Protective agent 18 | D-Glucose dehydration-condensation product | 100 | — | 10 | Glyceryl monostearate | 3.5 | 90 | — | 0 |
| Example 19 | Protective agent 19 | D-Glucose dehydration-condensation product | 5 | — | 10 | Glyceryl monostearate | 3.5 | 90 | — | 0 |
| Example 20 | Protective agent 20 | D-Glucose dehydration-condensation product | 120 | — | 10 | Glyceryl monostearate | 3.5 | 90 | — | 0 |
| Example 21 | Protective agent 21 | D-Glucose dehydration-condensation product | — | 400 | 10 | Glyceryl monostearate | 3.5 | 90 | — | 0 |
| Example 22 | Protective agent 22 | D-Glucose dehydration-condensation product | — | 6000 | 10 | Glyceryl monostearate | 3.5 | 90 | — | 0 |
| Example 23 | Protective agent 23 | D-Glucose dehydration-condensation product | — | 350 | 10 | Glyceryl monostearate | 3.5 | 90 | — | 0 |
| Example 24 | Protective agent 24 | D-Glucose dehydration-condensation product | — | 7000 | 10 | Glyceryl monostearate | 3.5 | 90 | — | 0 |
| Example 25 | Protective agent 25 | D-Glucose dehydration-condensation product | 90 | — | 10 | Glyceryl monostearate | 3.5 | 65 | Fischer-Tropsch wax FT-115 | 25 |
| Example 26 | Protective agent 26 | D-Glucose dehydration-condensation product | 90 | — | 8 | Glyceryl monostearate | 3.5 | 52 | Fischer-Tropsch wax FT-115 | 40 |
| Comparative Example 1 | Protective agent 27 | Polyethylene glycol | 90 | — | 25 | Glyceryl monostearate | 3.5 | 75 | — | 0 |
| Comparative Example 2 | Protective agent 28 | — | — | 1500 | 25 | Glyceryl monostearate | 3.5 | 75 | — | 0 |
| Comparative Example 3 | Protective agent 29 | — | — | — | — | Glyceryl monostearate | 3.5 | 100 | — | 0 |
| Comparative Example 4 | Protective agent 30 | — | — | — | — | Sorbitan tristearate | 1.5 | 100 | — | 0 |
| Comparative Example 5 | Protective agent 31 | — | — | — | — | Zinc stearate | 1.2 | 100 | — | 0 |

TABLE 2

| | | Preparation conditions | | | | | |
|---|---|---|---|---|---|---|---|
| | | Endothermic peak temperature (° C.) | Melt temperature (° C.) | Mold preheat temperature (° C.) | Primary cooling temperature (° C.) | Reheating temperature (° C.) | Reheating retention time (min) | Final cooling temperature (° C.) |
| Example 1 | Protective agent | 58 | 110 | 85 | 50 | 55 | 15 | 25 |
| Example 2 | Protective agent 2 | 55 | 110 | 85 | 45 | 50 | 15 | 25 |
| Example 3 | Protective agent 3 | 52 | 110 | 85 | 45 | 50 | 10 | 25 |
| Example 4 | Protective agent 4 | 51 | 110 | 85 | 40 | 45 | 10 | 25 |
| Example 5 | Protective agent 5 | 58 | 110 | 85 | 50 | 55 | 15 | 25 |
| Example 6 | Protective agent 6 | 58 | 110 | 85 | 50 | 55 | 15 | 25 |
| Example 7 | Protective agent 7 | 63 | 110 | 85 | 50 | 55 | 20 | 25 |
| Example 8 | Protective agent 8 | 80 | 130 | 95 | 65 | 85 | 20 | 25 |
| Example 9 | Protective agent 9 | 52 | 110 | 85 | 40 | 45 | 10 | 25 |
| Example 10 | Protective agent 10 | 82 | 130 | 95 | 65 | 85 | 20 | 25 |
| Example 11 | Protective agent 11 | 55 | 110 | 85 | 45 | 50 | 15 | 25 |
| Example 12 | Protective agent 12 | 54 | 110 | 85 | 45 | 50 | 15 | 25 |
| Example 13 | Protective agent 13 | 85 | 130 | 95 | — | — | — | 25 |
| Example 14 | Protective agent 14 | 51 | 110 | 85 | 40 | 45 | 10 | 25 |
| Example 15 | Protective agent 15 | 96 | 130 | 105 | 75 | 85 | 20 | 25 |
| Example 16 | Protective agent 16 | 140 | 180 | 135 | — | — | — | 25 |
| Example 17 | Protective agent 17 | 58 | 110 | 85 | 55 | 55 | 15 | 25 |
| Example 18 | Protective agent 18 | 58 | 110 | 85 | 55 | 55 | 15 | 25 |
| Example 19 | Protective agent 19 | 58 | 110 | 85 | 55 | 55 | 15 | 25 |
| Example 20 | Protective agent 20 | 58 | 110 | 85 | 55 | 55 | 15 | 25 |
| Example 21 | Protective agent 21 | 47 | 110 | 85 | — | — | — | 25 |
| Example 22 | Protective agent 22 | 58 | 110 | 85 | 55 | 55 | 15 | 25 |
| Example 23 | Protective agent 23 | 46 | 110 | 85 | — | — | — | 25 |
| Example 24 | Protective agent 24 | 58 | 110 | 85 | 55 | 55 | 15 | 25 |
| Example 25 | Protective agent 25 | 58/110 | 150 | 120 | 55 | 55 | 15 | 25 |
| Example 26 | Protective agent 26 | 58/110 | 150 | 120 | 55 | 55 | 15 | 25 |
| Comparative Example 1 | Protective agent 27 | 58 | 110 | 85 | 55 | 55 | 15 | 25 |
| Comparative Example 2 | Protective agent 28 | 49 | 110 | 85 | — | — | — | 25 |
| Comparative Example 3 | Protective agent 29 | 58 | 110 | 85 | — | — | — | 25 |
| Comparative Example 4 | Protective agent 30 | 53 | 110 | 85 | — | — | — | 25 |
| Comparative Example 5 | Protective agent 31 | 140 | 180 | 135 | — | — | — | 25 |

Example 27

Subsequent to transfer operation, around an image carrier (photoconductor) having a surface layer including a thermosetting resin (heat radical reaction-type polyfunctional acrylic resin) and having a thickness of 5 micrometer were formed a counter-type cleaning blade, a brush-form protective-agent feeding member, and a trailing blade-type protective-layer forming member in this order from the upstream side to prepare a process cartridge having a protective-layer forming device using the protective agent 1 in Example 1.

The process cartridge obtained was set in an image forming apparatus (Color MFP imagio Neo C600; manufactured by Ricoh Company, Ltd.) which was modified so that the process cartridge could be set in the apparatus, and a continuous image output test for 100,000 sheets of paper using an original having A4 size and an image area ratio of 6% was conducted. Before and after the test, the image was examined as to whether a defect was caused in a normal temperature and normal humidity environment at 50% relative humidity (RH) at 20° C., in a low temperature and low humidity environment at 25% RH at 10° C., or in a high temperature and high humidity environment at 80% RH at 35° C.

For evaluating the stability to a change of environment, the process cartridge was subjected to 1 hour-period storage heat cycle 50 times in a low humidity environment at 25% RH at 10° C. or in a high humidity environment at 80% RH at 35° C., and then an image was output and examined as to whether a defect was caused.

In this test, as the toner, toner prepared by polymerization, having a weight average particle diameter (D4) of 5.2 micrometers, a number average particle diameter (D1) of 4.5 micrometers, a D4/D1 ratio of 1.16, and an average circularity of 0.98, was used.

With respect to the image defect after the continuous paper feed test, a line-form defect of image, halftone image unevenness, fogging on the white portion, and image blur each relating the cleaning performance were individually evaluated according to the following criteria.

(Evaluation Criteria of Line-Form Defect of Image)
●: Excellent
○: No problem in practical use
Δ: Practically acceptable
x: Unusable (Evaluation Criteria of Halftone Image Unevenness)
●: Excellent
○: No problem in practical use
Δ: Practically acceptable
x: Unusable (Evaluation Criteria of Image Defect of Fogging on White Portion)
●: Excellent
○: No problem in practical use
Δ: Practically acceptable
x: Unusable (Evaluation Criteria of Image Defect of Image Blur)
●: Excellent
○: No problem in practical use
Δ: Practically acceptable
x: Unusable For evaluating the effect of the deterioration of the image carrier, cleaning blade, or charging member on the image, with respect to each member, the initial state and the state after the output of 100,000 sheets of paper were individually observed, and examined as to whether a defect was caused, and evaluated according to the following criteria.

(Evaluation Criteria of State of Each Member)
○: Equivalent to initial level
Δ: Slightly changed (practically usable)
x: Deteriorated As a result, deterioration due to an increase of the number of output sheets of paper was not observed in each member, and both the initial image quality and the image quality obtained after the output of 100,000 sheets of paper were excellent, and no defect was found in the image obtained after the heat cycle, which indicates that the image forming apparatus according to the present invention is excellent in both image quality and life.

The results of the evaluations of image quality are shown in Tables 3 and 4, and the results of observation of the deterioration of the members are shown in Table 5.

With respect to the image forming apparatus in Example 27, subsequent to the continuous image output test, a paper feed test of up to 500,000 sheets of paper in total was conducted. As a result, no adverse effect on the image was found, and almost no deterioration of the image carrier, cleaning member, or charging member was recognized.

Examples 28 to 52

Evaluations were individually conducted in substantially the same manner as in Example 27 except that the protective agent 1 was changed to protective agents 2 to 26.

The results of the evaluations of image quality are shown in Tables 3 and 4, and the results of observation of the deterioration of the members are shown in Table 5.

With respect to the image forming apparatus in Example 28, a paper feed test of up to 500,000 sheets of paper in total was subsequently conducted. As a result, no adverse effect on the image was found, and almost no deterioration of the image carrier, cleaning member, or charging member was recognized.

Comparative Examples 6 to 10

Evaluations were individually conducted in substantially the same manner as in Example 27 except that, instead of the protective agent 1, protective agents 27 to 31 were individually used.

The results of the evaluations of image quality are shown in Tables 3 and 4, and the results of observation of the deterioration of the members are shown in Table 5.

Example 53

Subsequent to transfer operation, around an image carrier having a surface layer including a thermosetting resin (heat radical reaction-type polyfunctional acrylic resin) and having a thickness of 5 micrometers were formed a brush-form protective-agent feeding member and a protective-layer forming member, which served also as a counter-type cleaning blade, in this order from the upstream side to prepare a process cartridge having a protective-layer forming device using the protective agent 1 in Example 1.

The process cartridge obtained was set in an image forming apparatus (Color MFP imagio Neo C455; manufactured by Ricoh Company, Ltd.) which was modified so that the process cartridge could be set in the apparatus, and a continuous image output test for 100,000 sheets of paper using an original having A4 size and an image area ratio of 6% was conducted, and, before and after the test, the image was examined as to whether a defect was caused.

In this test, as the toner, toner prepared by polymerization, having a weight average particle diameter (D4) of 5.2 micrometers, a number average particle diameter (D1) of 4.5 micrometers, a D4/D1 ratio of 1.16, and an average circularity of 0.98, was used.

With respect to the image defect, a line-form defect of image, halftone image unevenness, fogging on the white portion, and image blur each relating the cleaning performance were individually evaluated in the same manner as in Example 27.

For evaluating the effect of the deterioration of the image carrier, cleaning blade, or charging member on the image, with respect to each member, the initial state and the state after the output of 100,000 sheets of paper were individually observed in the same manner as in Example 27, and examined as to whether a defect was caused.

The results of the evaluations of image quality are shown in Tables 3 and 4, and the results of observation of the deterioration of the members are shown in Table 5.

Example 54

A test was conducted in substantially the same manner as in Example 27 except that the protective-agent feeding member was removed and the protective agent was fed by directly pressing the protective agent against the image carrier.

The results of the evaluations of image quality are shown in Tables 3 and 4, and the results of observation of the deterioration of the members are shown in Table 5.

Example 55

A test was conducted in substantially the same manner as in Example 27 except that, as the image carrier, an image carrier containing no thermosetting resin (heat radical reaction-type polyfunctional acrylic resin) in the surface layer was used.

The results of the evaluations of image quality are shown in Tables 3 and 4, and the results of observation of the deterioration of the members are shown in Table 5.

Example 56

A test was conducted in substantially the same manner as in Example 27 except that, as the toner, toner prepared by polymerization, having a weight average particle diameter (D4) of 6.0 micrometers, a number average particle diameter (D1) of 5.3 micrometers, a D4/D1 ratio of 1.13, and an average circularity of 0.90, was used.

The results of the evaluations of image quality are shown in Tables 3 and 4, and the results of observation of the deterioration of the members are shown in Table 5.

Example 57

A test was conducted in substantially the same manner as in Example 27 except that, as the toner, toner prepared by polymerization, having a weight average particle diameter (D4) of 5.4 micrometers, a number average particle diameter (D1) of 3.5 micrometers, a D4/D1 ratio of 1.54, and an average circularity of 0.98, was used.

The results of the evaluations of image quality are shown in Tables 3 and 4, and the results of observation of the deterioration of the members are shown in Table 5.

TABLE 3

| | Results of evaluation (Initial) | | | | | | | | | | | | |
|---|---|---|---|---|---|---|---|---|---|---|---|---|---|
| | Image quality (Normal temperature, normal humidity) | | | | Image quality (Low temperature, low humidity) | | | | Image quality (High temperature, high humidity) | | | | |
| | Line-form defect | Image unevenness | Fogging on white portions | Image quality | Line-form defect | Image unevenness | Fogging on white portions | Image quality | Line-form defect | Image unevenness | Fogging on white portions | Image quality | Defect after heat cycle |
| Example 27 | ● | ● | ● | ● | ● | ● | ● | ● | ● | ● | ● | ● | NONE |
| Example 28 | ● | ● | ● | ● | ● | ● | ● | ● | ● | ● | ● | ● | NONE |
| Example 29 | ● | ● | ● | ● | ● | ● | ● | ● | ● | ● | ● | ● | NONE |
| Example 30 | ● | ● | ● | ● | ● | ● | ● | ● | ● | ● | ● | ● | NONE |
| Example 31 | ● | ● | ● | ● | ● | ● | ● | ● | ● | ● | ● | ● | NONE |
| Example 32 | ● | ● | ● | ● | ● | ● | ● | ● | ● | ● | ● | ● | Very slight line-form stain |
| Example 33 | ● | ● | ● | ● | ● | ● | ● | ● | ● | ● | ● | ● | NONE |
| Example 34 | ● | ● | ● | ● | ● | ● | ○ | ● | ● | ● | ● | ● | NONE |
| Example 35 | ● | ● | ● | ● | ● | ● | ● | ● | ● | ● | ● | ○ | NONE |
| Example 36 | ● | ○ | ● | ● | ● | ● | ○ | ● | ● | ● | ● | ● | Very slight image unevenness |

TABLE 3-continued

Results of evaluation (Initial)

| | Image quality (Normal temperature, normal humidity) | | | | Image quality (Low temperature, low humidity) | | | | Image quality (High temperature, high humidity) | | | | |
|---|---|---|---|---|---|---|---|---|---|---|---|---|---|
| | Line-form defect | Image unevenness | Fogging on white portions | Image quality | Line-form defect | Image uneven-ness | Fogging on white portions | Image quality | Line-form defect | Image uneven-ness | Fogging on white portions | Image quality | Defect after heat cycle |
| Example 37 | ● | ● | ○ | ● | ● | ● | ○ | ● | ● | ● | ● | ● | NONE |
| Example 38 | ● | ● | ● | ● | ● | ● | ● | ● | ● | ● | ● | ● | NONE |
| Example 39 | ● | ● | ● | ● | ● | ● | ● | ● | ● | ● | ● | ● | NONE |
| Example 40 | ● | △ | ● | ● | ● | △ | ● | ● | ● | ● | ● | ○ | NONE |
| Example 41 | ● | ○ | ● | ● | ○ | ● | ● | ● | ● | ● | ● | ● | NONE |
| Example 42 | ● | ● | ● | ● | ● | ● | ● | ● | ● | ● | ● | ○ | Very slight line-form stain |
| Example 43 | ● | ● | ○ | ● | ● | ● | ○ | ● | ● | ● | ● | ● | Very slight fogging on white portion |
| Example 44 | ● | ● | ● | ● | ● | ○ | ● | ● | ● | ○ | ● | ● | NONE |
| Example 45 | ● | ● | ○ | ● | ● | ● | ○ | ● | ● | ● | ● | ○ | Slight fogging on white portion |
| Example 46 | ● | ○ | ● | ● | ● | ○ | ● | ● | ● | ○ | ● | ● | NONE |
| Example 47 | ● | ● | ○ | ● | ● | ● | ○ | ● | ● | ● | ● | ● | Very slight fogging on white portion |
| Example 48 | ● | ● | ● | ● | ● | ○ | ● | ● | ● | ○ | ● | ● | NONE |
| Example 49 | ● | ● | ○ | ● | ● | ● | ○ | ● | ● | ● | ● | ○ | Slight fogging on white portion |
| Example 50 | ● | ○ | ● | ● | ● | ○ | ● | ● | ● | ○ | ● | ● | NONE |
| Example 51 | ● | ● | ● | ● | ● | ● | ● | ● | ● | ● | ○ | ● | NONE |
| Example 52 | ○ | ● | ○ | ● | ○ | ○ | ● | ● | ● | ○ | ● | ● | NONE |
| Example 53 | ● | ● | ● | ● | ● | ● | ● | ● | ● | ● | ● | ● | NONE |
| Example 54 | ● | ● | ● | ● | ○ | ○ | ● | ● | ● | ● | ● | ○ | NONE |
| Example 55 | ● | ● | ● | ● | ● | ○ | ● | ● | ● | ○ | ● | ● | NONE |
| Example 56 | ● | ● | ● | ● | ● | ○ | ● | ● | ● | ● | ● | ● | NONE |
| Example 57 | ● | ● | ● | ● | ○ | ● | ● | ● | ● | ● | ○ | ● | NONE |
| Comparative Example 6 | ● | ● | ● | ● | ○ | ○ | ● | ● | ● | ● | ● | ○ | NONE |
| Comparative Example 7 | ● | ● | ● | ● | ● | ○ | ● | ● | ● | ● | ● | ○ | Line-form stain |
| Comparative Example 8 | ● | ● | ● | ● | ○ | ● | ● | ● | ● | ● | ● | ○ | Image blur |
| Comparative Example 9 | ● | ● | ● | ● | ○ | ○ | ● | ● | ● | ● | ● | ● | Image blur |
| Comparative Example 10 | ● | ● | ● | ● | ○ | ● | ● | ● | ● | ● | ● | ● | NONE |

TABLE 4

| | Results of evaluation (After continuous output) | | | | | | | | | | | |
|---|---|---|---|---|---|---|---|---|---|---|---|---|
| | Image quality (Normal temperature, normal humidity) | | | | Image quality (Low temperature, low humidity) | | | | Image quality (High temperature, high humidity) | | | |
| | Line-form defect | Image unevenness | Fogging on white portions | Image quality | Line-form defect | Image unevenness | Fogging on white portions | Image quality | Line-form defect | Image unevenness | Fogging on white portions | Image quality |
| Example 27 | ● | ● | ● | ● | ● | ● | ● | ● | ● | ● | ● | ● |
| Example 28 | ● | ● | ● | ● | ● | ● | ● | ● | ● | ● | ● | ● |
| Example 29 | ● | ● | ● | ● | ● | ● | ● | ● | ● | ● | ● | ● |
| Example 30 | ● | ● | ● | ● | ● | ● | ● | ● | ● | ● | ● | ● |
| Example 31 | ● | ● | ● | ● | ● | ● | ● | ● | ● | ● | ● | ○ |
| Example 32 | ● | ● | ● | ● | ● | ● | ● | ● | ● | ● | ● | ● |
| Example 33 | ● | ● | ● | ● | ● | ● | ● | ● | ● | ● | ● | ○ |
| Example 34 | ● | ○ | ● | ● | ● | ○ | ● | ● | ● | ● | ● | ● |
| Example 35 | ● | ● | ● | ● | ● | ● | ● | ● | ● | ● | ● | △ |
| Example 36 | ● | △ | ● | ● | ● | △ | ● | ● | ● | ● | ● | ● |
| Example 37 | ● | ● | ○ | ● | ● | ● | △ | ● | ● | ● | ● | ● |
| Example 38 | ● | ● | ● | ● | ● | ● | ● | ● | ● | ● | ● | ● |
| Example 39 | ● | ● | ● | ● | ● | ● | ● | ● | ● | ● | ● | ● |
| Example 40 | ● | △ | ● | ● | ● | △ | ● | ● | ● | ● | ● | △ |
| Example 41 | ● | ○ | ● | ● | △ | ● | ● | ● | ● | ● | ● | ● |
| Example 42 | ○ | ● | ● | ● | △ | ● | ● | ● | ● | ● | ● | △ |
| Example 43 | ● | ● | ○ | ● | ● | ● | ○ | ● | ● | ● | ● | ○ |
| Example 44 | ● | △ | ● | ● | ● | △ | ● | ● | ● | ○ | ● | ○ |
| Example 45 | ● | ● | △ | ● | ● | ● | △ | ● | ● | ● | ● | △ |
| Example 46 | ● | △ | ● | ● | ● | △ | ● | ● | ● | △ | ● | △ |
| Example 47 | ● | ● | ○ | ● | ● | ● | ○ | ● | ● | ● | ● | ○ |
| Example 48 | ● | △ | ● | ● | ● | △ | ● | ● | ● | ○ | ● | ○ |
| Example 49 | ● | ● | △ | ● | ● | ● | △ | ● | ● | ● | ● | △ |
| Example 50 | ● | △ | ● | ● | ● | △ | ● | ● | ● | △ | ● | △ |
| Example 51 | ○ | ● | ○ | ● | △ | ● | ○ | ● | ● | ○ | ○ | ● |
| Example 52 | ○ | ● | △ | ● | △ | ○ | △ | ● | ● | △ | ● | ● |
| Example 53 | ● | ● | ● | ● | ● | ● | ● | ● | ● | ● | ● | ○ |
| Example 54 | ● | ● | ● | ● | ○ | ○ | ● | ● | ● | ● | ● | △ |
| Example 55 | ● | ● | ● | ● | ● | ○ | ● | ● | ● | ○ | ● | ● |
| Example 56 | ● | ○ | ● | ● | ● | ○ | ● | ● | ● | ○ | ● | ● |
| Example 57 | ○ | ● | ● | ● | ○ | ● | ● | ● | ● | ● | △ | ● |
| Comparative Example 6 | ○ | ○ | ● | ○ | △ | X | ● | ● | ● | ● | ● | X |
| Comparative Example 7 | ● | ○ | ● | ○ | ○ | X | ● | ● | ● | ● | ● | X |
| Comparative Example 8 | X | △ | △ | ● | X | △ | △ | ● | ○ | X | ● | X |
| Comparative | X | ○ | ● | ● | X | X | ● | ● | △ | ○ | X | ○ |

TABLE 4-continued

| | Results of evaluation (After continuous output) | | | | | | | | | | | |
|---|---|---|---|---|---|---|---|---|---|---|---|---|
| | Image quality (Normal temperature, normal humidity) | | | | Image quality (Low temperature, low humidity) | | | | Image quality (High temperature, high humidity) | | | |
| | Line-form defect | Image unevenness | Fogging on white portions | Image quality | Line-form defect | Image unevenness | Fogging on white portions | Image quality | Line-form defect | Image unevenness | Fogging on white portions | Image quality |
| Example 9 Comparative Example 10 | X | Δ | ● | ● | X | X | ● | ● | Δ | ○ | ○ | Δ |

TABLE 5

State of members (After continuous output)

| | Image carrier | Cleaning member | Charging member |
|---|---|---|---|
| Example 27 | ○ | ○ | ○ |
| Example 28 | ○ | ○ | ○ |
| Example 29 | ○ | ○ | ○ |
| Example 30 | ○ | ○ | ○ |
| Example 31 | Δ | ○ | ○ |
| Example 32 | ○ | Δ | ○ |
| Example 33 | ○ | ○ | ○ |
| Example 34 | ○ | Δ | ○ |
| Example 35 | Δ | ○ | ○ |
| Example 36 | Δ | Δ | ○ |
| Example 37 | Δ | ○ | ○ |
| Example 38 | ○ | ○ | ○ |
| Example 39 | ○ | ○ | ○ |
| Example 40 | Δ | ○ | ○ |
| Example 41 | Δ | ○ | ○ |
| Example 42 | Δ | ○ | Δ |
| Example 43 | Δ | ○ | ○ |
| Example 44 | Δ | ○ | Δ |
| Example 45 | Δ | ○ | ○ |
| Example 46 | Δ | ○ | Δ |
| Example 47 | Δ | ○ | ○ |
| Example 48 | Δ | ○ | Δ |
| Example 49 | Δ | ○ | ○ |
| Example 50 | Δ | ○ | Δ |
| Example 51 | ○ | ○ | Δ |
| Example 52 | Δ | Δ | Δ |
| Example 53 | Δ | ○ | ○ |
| Example 54 | Δ | ○ | ○ |
| Example 55 | Δ | ○ | ○ |
| Example 56 | ○ | ○ | ○ |
| Example 57 | ○ | ○ | Δ |
| Comparison 6 | X | Δ | Δ |
| Comparison 7 | X | Δ | Δ |
| Comparison 8 | X | ○ | X |
| Comparison 9 | X | Δ | ○ |
| Comparison 10 | X | X | X |

As can be seen from the results shown in Tables 1 to 5, in Examples 27 to 57 using the protective agent according to the present invention, the image quality is excellent in respect of the line-form defect, image unevenness, fogging on the white portion, and image blur, no deterioration of the image quality is caused due to the heat cycle, and almost no deterioration of the image carrier, cleaning member, or charging member is caused due to an increase of the number of output sheets of paper, as compared to those in Comparative Examples 6 to 10.

From a comparison between Example 27 (the protective agent 1), Example 51 (the protective agent 25), and Example 52 (the protective agent 26) having different contents of the hydrophilic organic compound and amphiphilic organic compound, it is found that, the lower the content of the hydrophilic organic compound and amphiphilic organic compound, the poorer the performance of the protective agent, and, when the content is less than 75% by weight, the performance becomes markedly poor with respect to the image quality, particularly uniformity of image.

From a comparison between Example 27 (the protective agent 1) and Examples 43 to 46 (the protective agents 17 to 20) having substantially the same construction except for the monosaccharide condensation number (saccharide number) of a polysaccharide used as the hydrophilic organic compound, it is found that, when the saccharide number is too small or too large, image blur caused in a high-humidity environment tends to be slightly marked where the image blur is presumed to be caused due to the unclear latent image formed on the surface of the image carrier.

From a comparison between Example 29 (the protective agent 3) and Examples 47 to 50 (the protective agents 21 to 24) having substantially the same construction except for the weight average molecular weight (Mw) of a polyether compound used as the hydrophilic organic compound, it is found that, when the weight average molecular weight is too small or too large, image blur caused in a high-humidity environment tends to be slightly marked where the image blur is presumed to be caused due to the unclear latent image formed on the surface of the image carrier.

From a comparison of Example 37 (the protective agent 11) having an amphiphilic organic compound having a lipophilic group of a branched structure with Example 27 (the protective agent 1) having substantially the same construction as in Example 37 except that the lipophilic group in the amphiphilic organic compound is a linear alkyl, it is found that the wear amount of the surface layer of the image carrier is slightly increased and hence the protection effect for the image carrier is slightly poor.

From a comparison between Examples 38 to 41 (the protective agents 12 to 15) and Examples 27 and 28 (the protective agents 1 and 2) having amphiphilic organic compounds having lipophilic groups having different carbon atom numbers, it is found that, when the carbon atom number is too large, slight unevenness of the application of the protective agent occurs where the unevenness is presumed to be caused due to the hydrophilic organic compound which is not uniformly dispersed in the protective agent. On the other hand, when the carbon atom number is too small, filming on the image carrier occurs where the filming is presumed to be caused due to too high compatibility of the image carrier with the hydrophilic organic compound. From these results, it is found that the both cases adversely affect the image.

From a comparison of Example 42 (the protective agent 16) containing an anionic surfactant with Example 27 (the protective agent 1), it is found that, when an anionic surfactant is used, the effect of protecting the image carrier from electrical stresses is recognized; however, slightly marked image blur occurs in an environment at a high temperature and a high humidity.

From a comparison between Examples 33 to 36 (the protective agents 7 to 10) containing amphiphilic organic compounds having different HLB's and Examples 27 and 28 (the protective agents 1 and 2) having substantially the same construction as in Examples 33 to 36 except for the amphiphilic organic compound, it is found that, when the HLB is small or large, the effect of protecting the image carrier from electrical stresses is recognized; however, when the HLB is large, slightly marked image blur occurs in an environment at a high temperature and a high humidity and the edge of the cleaning member slightly markedly wears.

On the other hand, when the HLB is small, slight unevenness of the application of the protective agent occurs where the unevenness is presumed to be caused due to the hydrophilic organic compound which is not uniformly dispersed in the protective agent.

By contrast, in each of Comparative Examples 5 to 10 in which protective agents 27 to 31, which individually do not meet the requirement of the present invention, were used as a protective agent, the protective agent did not exhibit the effect of protecting the image carrier from electrical stresses while maintaining the image quality.

The problems accompanying the conventional techniques can be solved by the present invention, and there are provided a protective agent which is advantageous not only in that it can protect the image carrier from electrical stresses due to, for example, charging and mechanical stresses due to, for example, friction of a cleaning member, but also in that the protective agent which has deteriorated due to the electrical stresses is unlikely to adversely affect the image quality or peripheral members, a protective-layer forming device using the protective agent, and an image forming method, an image forming apparatus, and a process cartridge, each of which uses the above protective agent or protective-layer forming device and can stably provide excellent image quality.

As set forth hereinabove, according to an embodiment of the present invention, a protective agent includes at least a hydrophilic organic compound and an amphiphilic organic compound. The weight ratio of the hydrophilic organic compound to the amphiphilic organic compound is 1/99 to 20/80.

In the process of forming an image, the surface of an image carrier suffers not only cutting of molecular chains due to electrical stresses by charging operation or transfer operation but also oxidation due to oxygen in air and adhesion of water vapor. This causes the surface to be hydrophilic.

When the protective agent is applied to the partially hydrophilic surface of the image carrier, the amphiphilic organic compound contained therein having in its molecule both a structure exhibiting hydrophilicity and a structure exhibiting lipophilicity (hydrophobicity) adsorbs on the hydrophilic portion of the surface of the image carrier with the hydrophilic site in the molecule of the amphiphilic compound, and renders the adsorbing portion hydrophobic.

On the other hand, the hydrophilic organic compound forms a small region as a hydrophilic pocket isolated like an island by the amphiphilic organic compound present in a great amount around the hydrophilic organic compound, and draws therein a dissociating composition caused by air discharge and fixes it in the narrow region.

In the thus formed protective layer on the surface of the image carrier, the hydrophilic site is isolated, and therefore, even when a large amount of a hydrophilic substance is contained in air near the surface of the image carrier, the movement of charges over a large area can be prevented. For example, even when the image carrier is used at a high humidity, charges of an electrostatic latent image can be prevented from dissipating without lowering the resistance of the surface of the image carrier. After a protective layer is formed on the surface of the image carrier, electrical stresses are applied by the charging operation or transfer operation to the protective agent constituting the protective layer. This causes the molecular chains of the protective agent to be cut, oxidized, or become hydrophilic.

Accordingly, although the protective agent is partially decomposed, the electrical stresses on the image carrier are reduced, which prevents the deterioration of the image carrier. This allows the long-term use of the image carrier.

When the weight ratio of the hydrophilic organic compound to the amphiphilic organic compound is less than 1/99, the number of the isolated hydrophilic pockets is too small to satisfactorily draw a dissociating composition in the pockets. On the other hand, when the weight ratio is more than 20/80, it is difficult to isolate the hydrophilic pocket, so that the movement of charges over a large area cannot be prevented satisfactorily.

Protective-agent component which has deteriorated due to electrical stresses exhibits hydrophilicity. However, it is drawn in the hydrophilic portions of the excess amphiphilic organic compound present in the protective layer or the hydrophilic pockets formed from the hydrophilic organic compound, and thus not affected by ambient humidity. The protective agent component having the deterioration products drawn therein can be easily removed from a image forming system by, for example, a cleaning mechanism. Thus, the protective layer can be maintained fresh on the surface of the image carrier.

When the protective agent deteriorates due to cutting of a bond at the end portion of a protective-agent molecule, the end portion changes to a low molecular-weight substance, and the substance is vaporized by, for example, energy of the charged region and most of the resultant gas is discharged by an air flow from the image forming system. Among vaporized protective-agent deterioration components, a component, which has a relatively large molecular weight and is condensed according to the temperature of the peripheral member, possibly adheres to or adsorbs on the charging member and others. Such a low molecular-weight component is easily decomposed at the subsequent charging operation, and removed from the image forming system like other low molecular-weight components, causing almost no accumulation of the component on the peripheral member with passage of time. Therefore, with the protective agent, such a problem can be solved that a lubricant component containing a metal element is decomposed or oxidized and the resultant metal oxide is accumulated on the charging member to cause contamination, thus increasing the resistance.

The protective agent is relatively flexible and easily undergoes plastic deformation. Therefore, when the protective agent in a bulk form is directly pressed against the surface of the image carrier to form a protective layer, not only the excess protective agent lowers efficiency in forming a protective layer, but also the protective layer is multilayered and possibly inhibits light transmission at the exposure in which an electrostatic latent image is formed. This restricts the type of usable protective agent. However, with a feeding member arranged between the protective agent and the image carrier, even the flexible protective agent can be uniformly applied to the surface of the image carrier.

Moreover, an image forming apparatus includes a protective-layer forming device that forms a thin layer of the protective agent. Therefore, the image carrier can be used continuously for a long term without replacing it. Particularly, when the image carrier contains a thermosetting resin in the outermost surface layer thereof, by preventing the deterioration of the image carrier due to electrical stresses using the protective agent, the image carrier can continuously exhibit durability to mechanical stresses for a long term. That is, the image carrier has improved durability such that it can be used practically without replacing it.

The image forming apparatus includes a static charger in contact with or close to the surface of the image carrier, in which the discharge region is present very near the image carrier and hence it is likely that a large amount of electrical stresses are applied to the region. However, with a protective layer formed on the image carrier, the image carrier can be used without being exposed to electrical stresses. The image-carrier protective component contains substantially no metal component. Therefore, the static charger is improved in durability as well as not suffering from contamination by metal oxide and others.

The surface of the image carrier is prevented from changing by the effect of a protective layer formed thereon. Thus, the image carrier can be cleaned stably for a long term even when toner for use has a large average circularity or a small average particle diameter, cleaning of which sensitively varies depending on the change of state of the image carrier.

Furthermore, a process cartridge includes the protective-layer forming device, and can be replaced at long intervals, resulting in less running cost and waste amount. The protective agent contains substantially no metal component, and therefore, the static charger does not suffer from contamination by metal oxide and others, and can be prevented from changing with time. Therefore, constituent elements of the process cartridge, such as the image carrier or the static charger, can be easily reused, which further reduces the waste amount.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protective agent for forming a protective layer on an image carrier comprising a hydrophilic organic compound and an amphiphilic organic compound, wherein
    a weight ratio of the hydrophilic organic compound to the amphiphilic organic compound is 1/99 to 20/80.

2. The protective agent according to claim 1, wherein the hydrophilic organic compound contains a polysaccharide formed by dehydration-condensation of 10 to 100 monosaccharides on average.

3. The protective agent according to claim 1, wherein the hydrophilic organic compound contains a polyether compound having a weight average molecular weight of 400 to 6,000.

4. The protective agent according to claim 1, wherein the amphiphilic organic compound contains a nonionic surfactant.

5. The protective agent according to claim 4, wherein the nonionic surfactant is an ester compound of a polyhydric alcohol and an alkylcarboxylic acid is of a formula $C_nH_{2n+1}COOH$, where n is an integer from 15 to 35.

6. The protective agent according to claim 5, wherein the alkylcarboxylic acid is a linear alkylcarboxylic acid.

7. The protective agent according to claim 1, wherein the amphiphilic organic compound has a hydrophile-lipophile balance of 1.0 to 5.0.

8. The protective agent according to claim 1, wherein a total weight of the hydrophilic organic compound and the amphiphilic organic compound is 75% to 100% of weight of the protective agent.

9. An image forming apparatus comprising:
    an image carrier;
    an image forming unit that forms an electrostatic latent image on the image carrier;
    a developing unit that develops the electrostatic latent image into a visible image with toner;
    a transfer unit that transfers the visible image onto a recording medium;
    a fixing unit that fixes the visible image to the recording medium; and
    a protective-layer forming unit that applies a protective agent to a surface of the image carrier to form a protective layer on the surface, wherein
    the protective agent contains a hydrophilic organic compound and an amphiphilic organic compound, and
    a weight ratio of the hydrophilic organic compound to the amphiphilic organic compound is 1/99 to 20/80.

10. The image forming apparatus according to claim 9, further comprising a cleaning unit that is located downstream of the transfer unit and upstream of the protective-layer forming unit, and that removes residual toner on the surface of the image carrier.

11. The image forming apparatus according to claim 9, wherein the surface of the image carrier is covered by a layer that contains at least a thermosetting resin.

12. The image forming apparatus according to claim 9, wherein the image carrier is any one of a photoconductor and an intermediate transfer member.

13. The image forming apparatus according to claim 9, further comprising a charging unit that is in contact with or close to the surface of the image carrier to charge the surface.

14. The image forming apparatus according to claim 13, wherein the charging unit applies a voltage having an alternating-current component.

15. The image forming apparatus according to claim 9, wherein the toner has an average circularity of 0.93 to 1.00, the average circularity being an average of circularity represented by
    circularity=(perimeter of a circle having an area equal to a projected area of a toner particle)/(perimeter of a projected image of the toner particle).

16. The image forming apparatus according to claim 9, wherein a ratio of a weight-average particle diameter to a number-average particle diameter of the toner is 1.00 to 1.40.

17. A process cartridge that is configured to be detachably attached to an image forming apparatus, the process cartridge comprising:
    an image carrier; and
    a protective-layer forming unit that applies a protective agent to a surface of the image carrier to form a protective layer on the surface, wherein
    the protective agent contains a hydrophilic organic compound and an amphiphilic organic compound, and
    a weight ratio of the hydrophilic organic compound to the amphiphilic organic compound is 1/99 to 20/80.

18. The process cartridge according to claim 17, further comprising a cleaning unit that is located upstream of the protective-layer forming unit, and that removes residual toner on the surface of the image carrier.

* * * * *